United States Patent [19]

Sullivan et al.

[11] Patent Number: 4,659,876
[45] Date of Patent: Apr. 21, 1987

[54] AUDIOGRAPHICS COMMUNICATION SYSTEM

[75] Inventors: Thomas M. Sullivan, San Jose; Robert M. Pleva, Livermore; Thomas P. Matthews, San Jose, all of Calif.

[73] Assignee: SPI Soft Pac International, San Jose, Calif.

[21] Appl. No.: 527,797

[22] Filed: Aug. 30, 1983

[51] Int. Cl.$^4$ .......................................... H04M 11/06
[52] U.S. Cl. ...................................... 379/96; 379/100; 379/420
[58] Field of Search ................ 179/2 A, 2 TV, 2 DP, 179/81 B, 90 B

[56] References Cited

U.S. PATENT DOCUMENTS

| 4,431,870 | 2/1984 | May et al. | 179/90 B X |
| 4,476,559 | 10/1984 | Brolin et al. | 179/2 DP X |
| 4,485,400 | 11/1984 | Lemelson et al. | 179/2 TV X |
| 4,533,791 | 8/1985 | Read et al. | 179/2 DP X |

FOREIGN PATENT DOCUMENTS 0077360  5/1983  Japan .................................. 179/2 A

OTHER PUBLICATIONS

Conference: Electronic Text Communication, Munich Germany, Jun. 12-15, 1978, pp. 291-304, Bordewijk, "Teleboard, Scribophone and their Relation to Coded Text Transmission".
NTG-Fachber (Germany), vol. 73, 1980, pp. 167-171, Katagiri et al. "A Digital Video Telephone Subscriber Set with 64 KBIT/s Transmission Rate".

Primary Examiner—James L. Dwyer
Attorney, Agent, or Firm—Flehr, Hohbach, Test, Albritton & Herbert

[57] ABSTRACT

An interactive graphics and audio communications system is disclosed. The system enables users to communicate audibly and graphically over a single telephone connection.

9 Claims, 21 Drawing Figures

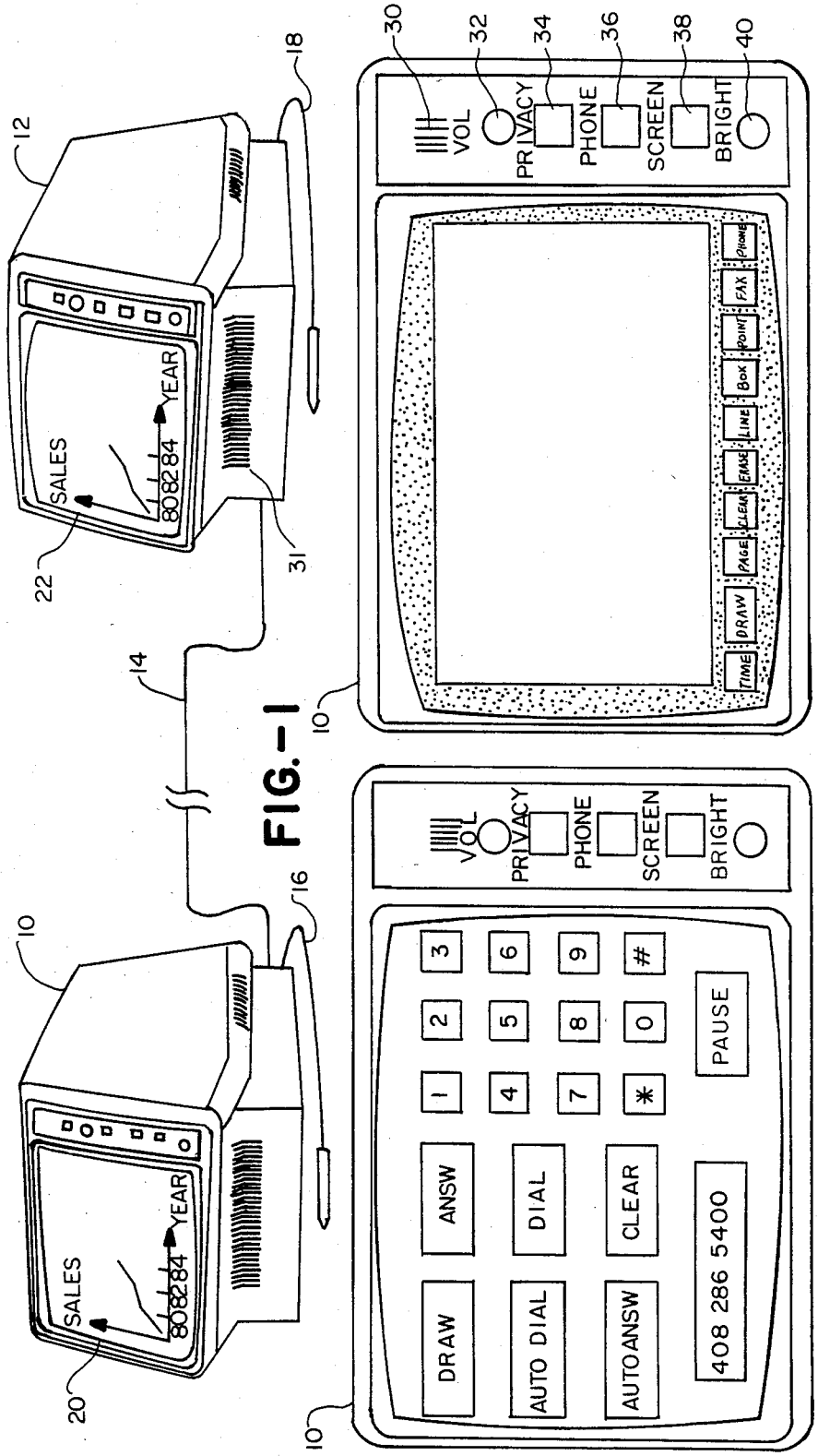

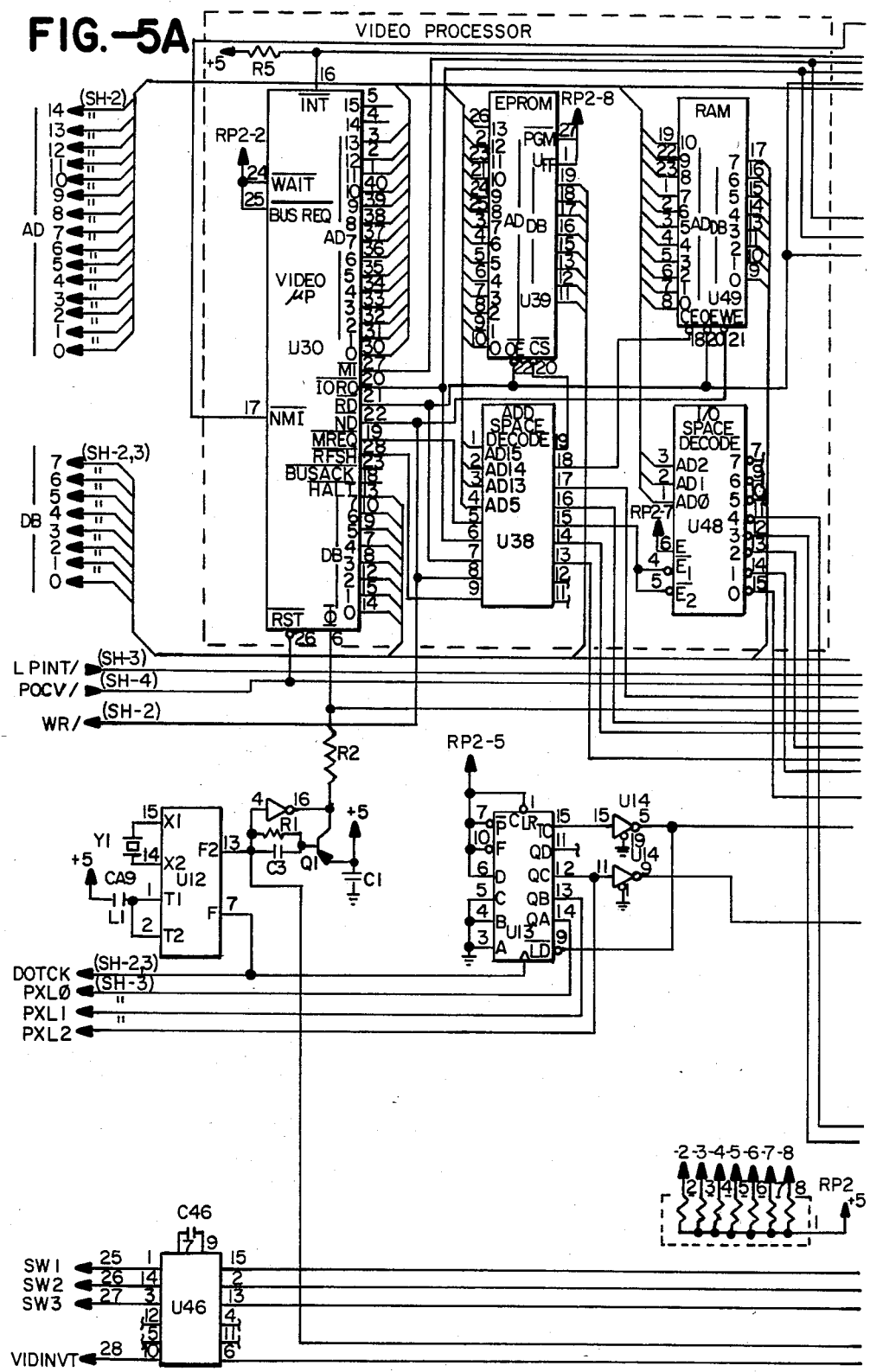
FIG.—5A

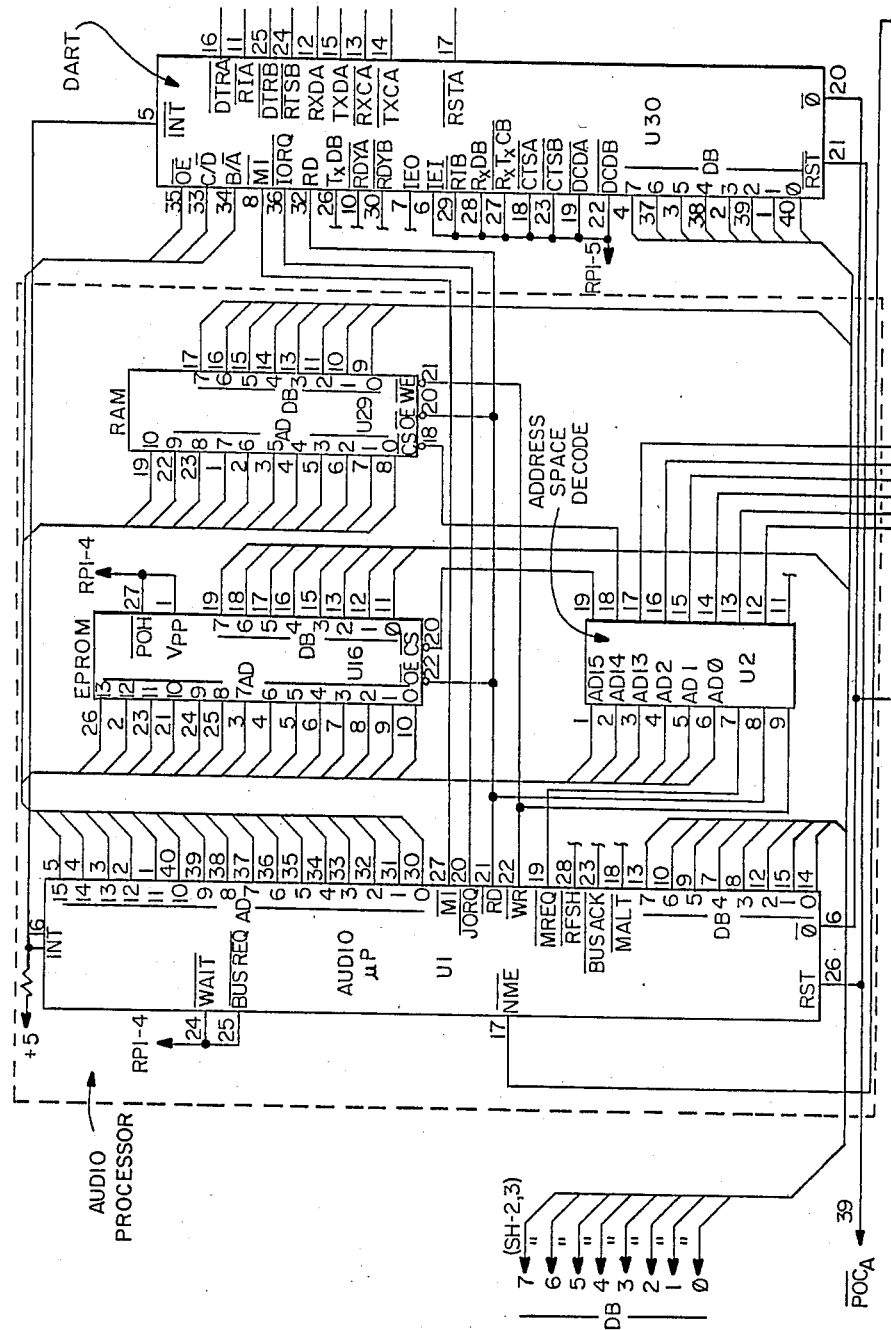

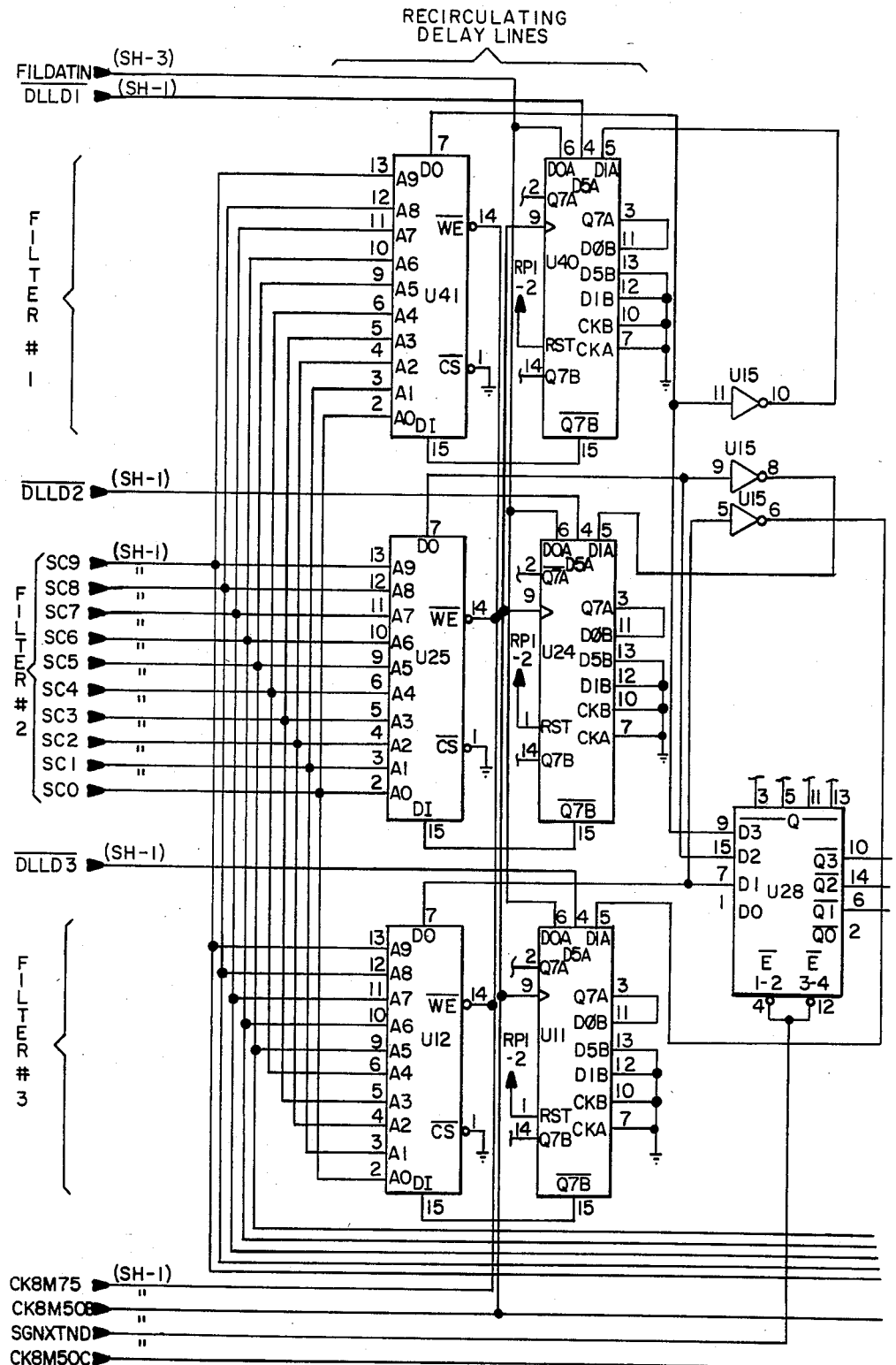
FIG.—9A

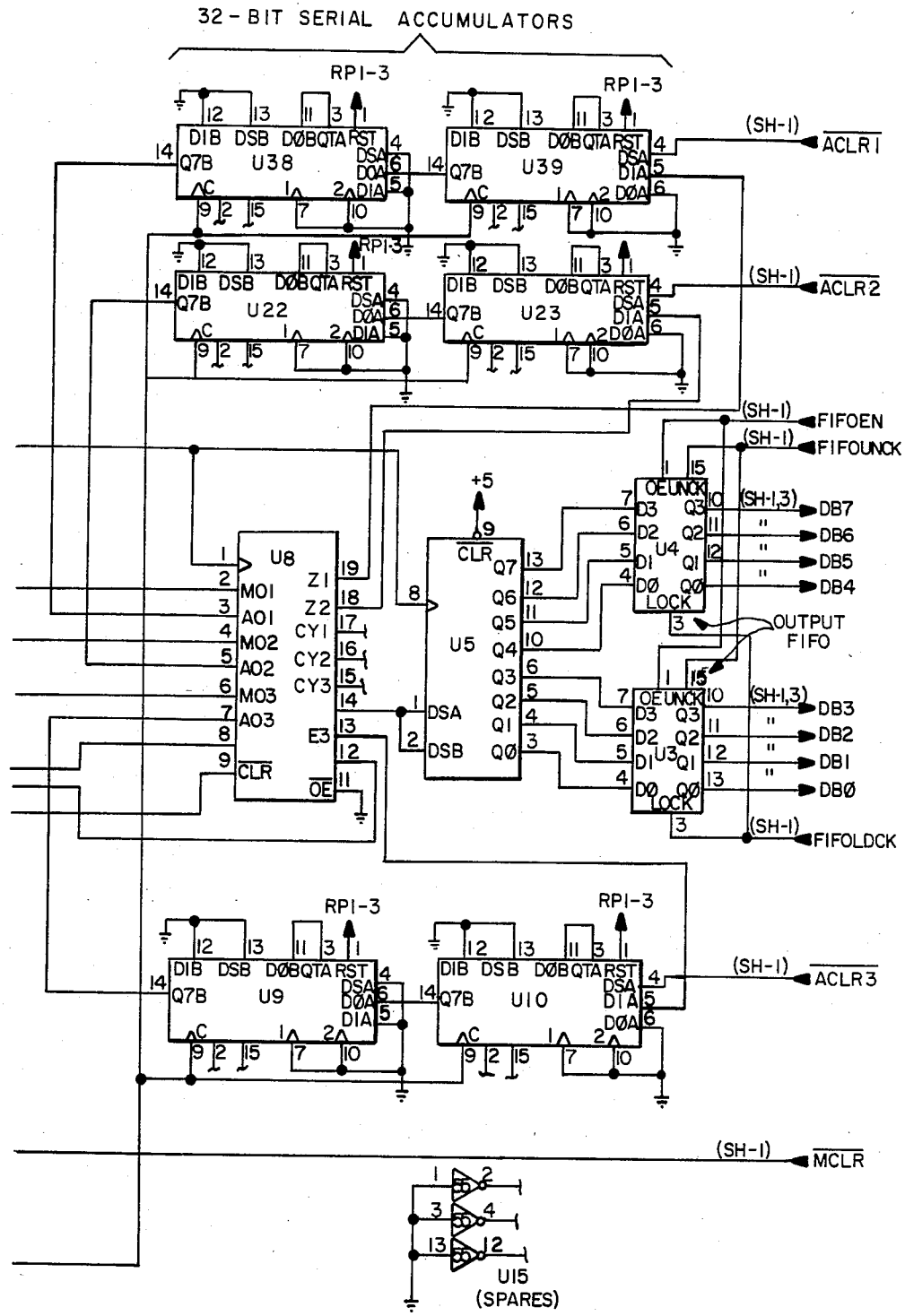
FIG.—9C

AUDIO PROCESSOR FLOW DIAGRAM

VIDEO PROCESSOR
NMI FLOW DIAGRAM

AUDIOGRAPHICS COMMUNICATION SYSTEM

BACKGROUND OF THE INVENTION

The present invention relates to an audiographics communication system and more particularly to an interactive graphics and audio communications terminal.

In an office or business environment, it is desirable to provide a communication capability for both audio and graphics information. There have been numerous prior art approaches relating to a communications capability for audio and graphics data which in general are quite complex and/or costly.

Part of the problem with the prior art is the difficulty in establishing voice and graphics communications in a suitable fashion. Some prior art systems provide for a terminal which will display graphics data but does not provide suitable interactive audio information with the graphics data. This aspect is undesirable in a business environment such as where a design engineer wishes to discuss a particular graphics display pattern with someone else located within the business. With such a prior art approach it becomes difficult and/or awkward to communicate on an audio basis while discussing the graphics data being displayed.

Some prior art approaches provide for audio and graphics intercommunications, but such approaches often require the use of what is known as an X-Y pad for "writing" the graphics data. The X-Y pad does not result in a common viewing and drawing surface, which often makes interaction among users awkward.

In view of the foregoing background, it is an objective of the present invention to provide an improved audiographics communications system.

SUMMARY OF THE INVENTION

The present invention relates to an audiographics communications system and terminal.

In one embodiment, the system includes a plurality of audiographic terminals interconnected to a common telephone line. Each of the terminals includes means for transmitting and receiving analog data over the common telephone line where the data includes information representing simultaneous audio and graphics information.

Each terminal also includes an integrated speakerphone to enable operators to converse with one another and display means for visually displaying the graphics data.

Each terminal also includes a light pen for enabling an operator to "write" graphics information on the display screen so that with interconnected terminals operators can audibly communicate easily and discuss the graphics data simultaneously displayed on the terminal. Thus, the viewing and drawing surfaces are one and the same, which enhances the interactiveness of the terminal.

In accordance with the foregoing summary, the present invention achieves the objective of providing an improved audiographics communication system.

Other objects and features of the present invention will become apparent from the following detailed description when taken in conjunction with the accompanying drawings.

BRIEF DESCRIPTION OF THE DRAWINGS

FIG. 1 depicts an audiographics communication system according to the present invention.

FIG. 2 depicts a presentation on a terminal in initial operation.

FIG. 3 depicts drawing page control pads appearing on a terminal of FIG. 1.

DESCRIPTION OF THE DRAWINGS

Figure 4:
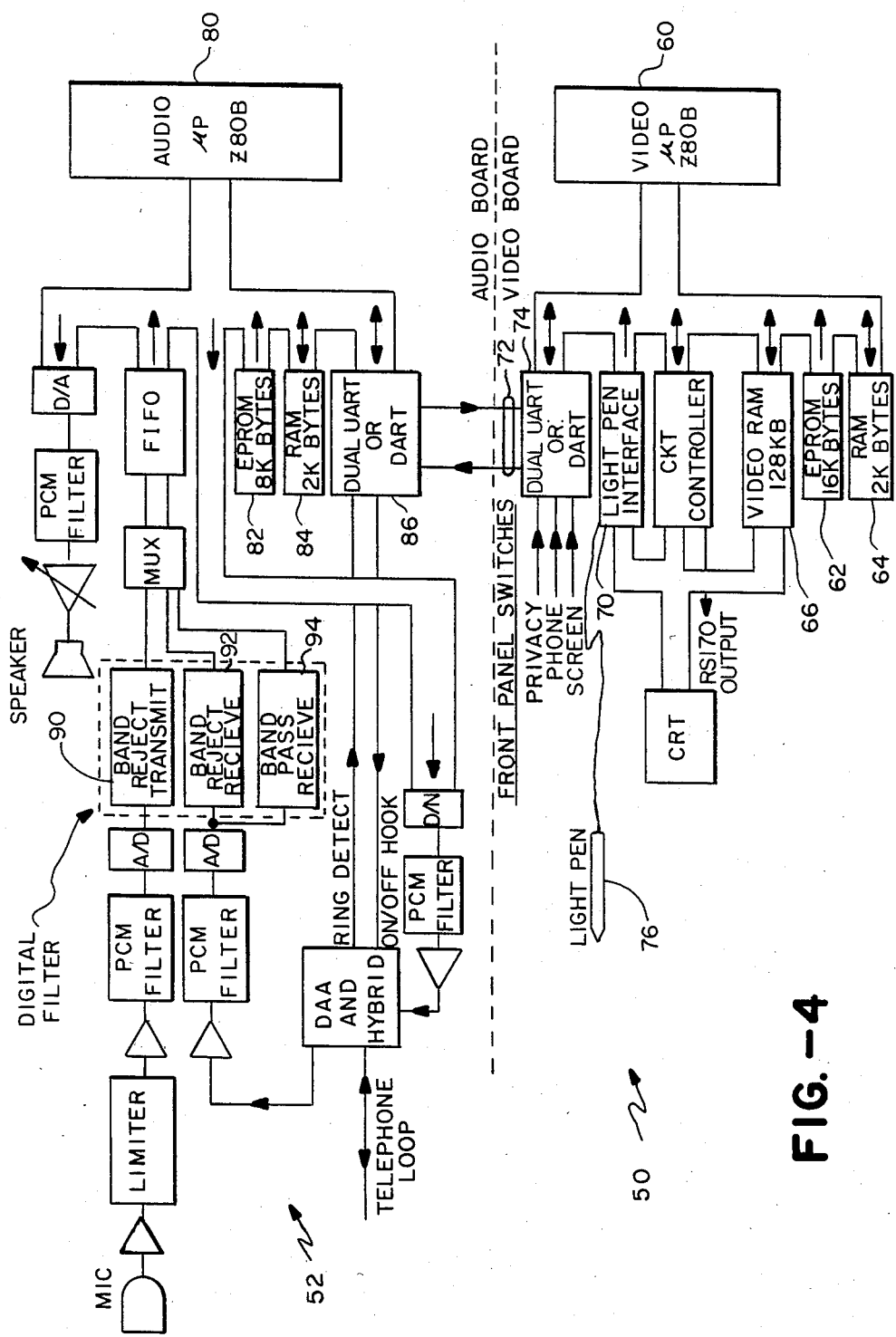
FIG. 4 depicts an internal block diagram of an interactive audiographics terminal of FIG. 1.

Referring now to FIG. 1, an interactive audiographics communication system according to the present invention is illustrated. In FIG. 1, the interactive audiographics communication system includes a pair of terminals 10, 12 interconnected by a common telephone line 14.

Each terminal 10, 12 in FIG. 1 includes a respective light pen 16, 18 for enabling the "drawing" of figures on the respective screen 20, 22.

The interactive audiographics system depicted in FIG. 1 also includes a built-in speakerphone in order to permit users to simultaneously communicate verbally over telephone line 14 while discussing a graphics image written on either of the display screens 20, 22. The system in FIG. 1 permits users to communicate verbally and graphically over a single telephone line 14. The system can be used for studio teleconferencing and desk-to-desk or person-to-person communications. Additionally, a terminal 10, 12 can replace a telephone on a user's desk while providing graphics enhancement when another terminal is "called."

In FIG. 1, a user of terminal 10 can draw or write directly on the face 20 of the viewing and writing screen 20 using the light pen 16. As the image or text is drawn or written, it is transferred to another terminal 12 connected to telephone line 14. Users can also simultaneously communicate verbally through built-in speakerphones.

The system depicted in FIG. 1 is designed to be "user-friendly." All functions, including telephone dialing, can be performed by touching a light pen to the appropriate control pad on the display screen, as will be described. The control pads are typically described by single action words which enhance the simplicity of its use.

Referring now to FIG. 2, data typically displayed initially on the screen of a terminal 10 of FIG. 1 is illustrated. The display in FIG. 2 can be referred to as a "phone page." The specific functions illustrated in FIG. 2 are identified as follows:

Touchtone Pad

This block contains numeric pads 0-9, * and # as on a touchtone telephone set, and is used for the dialing function. There is also a "Pause" pad which is useful for autodialing. Touching this pad with a light pen inserts a "P" in the buffer pad and results in a two (2) second pause during autodialing to wait for necessary access or dial tones before the autodialing proceeds.

Answer/Hang-Up

This block corresponds to the telephone being either not in use (onhook), in which case this pad can be used to answer the phone, or in use (off-hook), in which case this pad can be used to hang up the phone.

Dial Pad

This block takes the telephone off-hook and allows dialing to commence. When the dial pad is touched by the light pen, the answer pad will automatically change to "hang-up", which indicates the phone is off-hook.

Autodial Pad

This block automatically takes the telephone off-hook and dials the number that appears in the buffer.

Autoanswer Pad

If a call is received when the telephone is in autoanswer mode, the telephone automatically goes off-hook and the caller will hear a short data signal. The caller can then choose to leave a drawn message on any available clear page.

Clear Pad

This pad clears the telephone number that appears in the buffer pad.

Buffer Pad

This block retains telephone number last dialed and is the number used for the autodial function.

Draw Pad

This pad gives access to a drawing pad. All functions are performed by touching the light pen directly on the screen pad, which provides a strong similarity to an ordinary telephone except for the use of the light pen. The sequence for placing a call on the terminal is as follows:

Touch the light pen to the pad marked "DIAL" in FIG. 2. This takes the telephone off the hook. When the dial tone is heard, proceed to the next step.

Using the light pen, touch each of the numeric pads in the sequence of the telephone number. The telephone on the other end will begin its normal ringing.

When the telephone or another terminal, such as terminal 12 in FIG. 1, has answered, voice communication can commence.

Do not "take" the pen (transmit) if the other end of the telephone connection is not a terminal according to the present invention. This will create annoying audio noises similar to those created by the touch tones.

Answering a call:

When the terminal rings, it can be answered by either (1) touching the answer pad with the light pen (the pad changes to "ha ang-up" indicating that the phone is off the hook), or (2) manually depressing the Phone switch on the right front panel of the CRT. When answering a call, a user speaks as in a normal telephone call.

Terminating a call:

Hanging-up or terminating a telephone call is accomplished by either (1) touching the hang-up pad (the pad changes to "answer" indicating that the phone is on the hook), or (2) manually depressing the Phone switch on the right front panel of the CRT. The dialed number remains in the buffer pad for possible redialing using the autodial pad.

Referring now to FIG. 3, several of the various graphic functions available will now be described. When the drawing page to be used has been selected, graphics can begin locally or the "take" pad can be used to allow transmission of the graphics to others. In order to determine what mode the user is in, the terminal uses normal and inverse video pads. When the pad is in normal video, the unit is in that mode. All other pads will be inverse video and not operational until they are activated by the light pen.

Graphics can only be created from one terminal at a time (half duplex). The Take/Give pad in FIG. 3 allows users to "take" or "give" control of the light pen. When a telephone connection is initially established, none of the users have control of the light pen. A user takes control by touching the light pen to the "Take" pad. This changes the pad to "Give" and puts the word "Transmit" on the right side to indicate that the unit is in "transmit" mode. At this time all other connected terminals will be incapable of transmitting graphics and all the control pads on the bottom of their page will disappear. The user in control of the light pen touches the "Give" pad before another user can add graphics. When the "Give" pad has been touched, it returns to "Take" and the control pads on all other connected units return. Users should then indicate verbally who will take control and do so by touching the "Take" pad. This verbal exchange is not absolutely necessary but will minimize the confusion and the remote possibility that two or more users will "take" the pen simultaneously. If this occurs, the transmission would be invalidated and require all users to "give" up the pen to clear the condition.

The drawing page control pads are described below and are illustrated in FIG. 3. All functions are activated by touching the light pen to the appropriate pad on the screen.

TAKE—A user with "Take" displayed does not have control of the light pen and therefore cannot transmit graphics until this pad is touched. When touched, it changes to "Give" and the word "Transmit" replaces the "Phone" pad to show that the unit is in transmit mode. Note: It is not necessary to "take" the pen in the local mode when no telephone connection has been established.

GIVE—A user with "Give" and "Transmit" displayed is the only one capable of transmitting graphics. The receiving units will have no control pads on their screen.

DRAW—Normal or default mode of the drawing page. Indicated by "normal video." This inverts momentarily when the page and clear pads are touched and remains inverted when in other modes like box, line, point or FAX.

PAGE—For sequential changing of the drawing pages.

CLEAR—Clears the entire page.

ERASE—Allows the light pen to erase any part of the graphics by tracing over the portion to be erased.

LINE—When in line mode, two (2) dots can be placed anywhere on the screen and the unit will automatically draw a line between them.

BOX—When in box mode, two (2) dots can be placed in diagonal corners and the unit will automatically fill in lines to form a box.

POINT—Point mode places a blinking pointer or cursor on the screen where the light pen touches it. The cursor can be moved around the screen by moving the light pen across the face of the screen. When the pen is lifted the cursor remains at the last location until the mode is changed.

FAX—Transmits a pre-drawn page. The page(s) are drawn locally, before any telephone connection is made. After the telephone connection has been established, the image on any or all pages can be transmitted to all connected terminals via the FAX mode.

PHONE—Returns the screen to the phone page. Once the pen has been take (putting the unit in transmit mode), access to the phone page is prevented. The pen must be given up to regain the ability to use the phone page.

Volume Control

Dial 32 controls the loudness of the speaker 31 by turning clockwise to increase volume or counterclockwise to decrease volume.

Privacy Switch

When button 34 is depressed, it mutes the outgoing audio portion of the telephone call, thus allowing a private discussion by the users at either end of the telephone connection. This is similar to a user holding his hand over the input portion of a handset and is a feature typically found on speakerphones.

Phone Switch

Switch 36 permits a user to manually answer or hang-up the telephone without using the light pen. The LED is lit when the telephone is in use (off-hook).

Screen Switch

Automatic screen blanking occurs if the light pen is not used for approximately five (5) minutes. This prevents screen burning. The image will return to full brightness by depressing screen switch 38.

Brightness Control

Controls the brightness of the video display. Turning the dial 40 clockwise increases the brightness. Low brightness setting should be avoided when using a light pen.

Now that a general overview of the initial operation of the interactive audiographics system has been described, a more detailed description of the present invention will be described in conjunction with the remaining Figures.

Referring now to FIG. 4, a block diagram of an audiographics terminal such as terminals 10 or 12 in FIG. 1 is depicted. In FIG. 4, the audiographics terminal is separated into two sections, an audio board 52 and a video board 50.

In FIG. 4, the video board includes an independent, Z-80 based microprocessor 60 which supports the graphics display and input functions within the terminal.

Major components and sub-systems within the video board 50 shown in FIG. 4 include:

(1) Z-80B processor configuration incorporating 16k byte EPROM 62 and 2k byte static RAM 64. The processor clock rate is 5 MHz.
(2) 128k byte dynamic RAM array 66 organized to provide four distinct bit-mapped (1 bit/pixel) display refresh buffers (DRB's) for image storage and display.
(3) LSI CRT controller 68 (CRT9007) for generating video timing and DRB addressing information.
(4) Light pen interface 70 providing "hit" synchronization and location storage registers.
(5) Asynchronous serial communications channel 72 for interprocessor (video board/audio board) communications.

Miscellaneous circuits not shown in FIG. 4 and not necessary for an understanding of the invention include: clock generation; power-on clear ("POC") signal generation; external switch debouncing; and optional additional serial communications channels.

The video board 50 connects to other terminal hardware components via an 86-pin P.C. edge connector (interprocessor link, external I/O, power), and a 20-pin right-angle header mounted on the card edge (CRT unit drive signals).

Figure 5B:
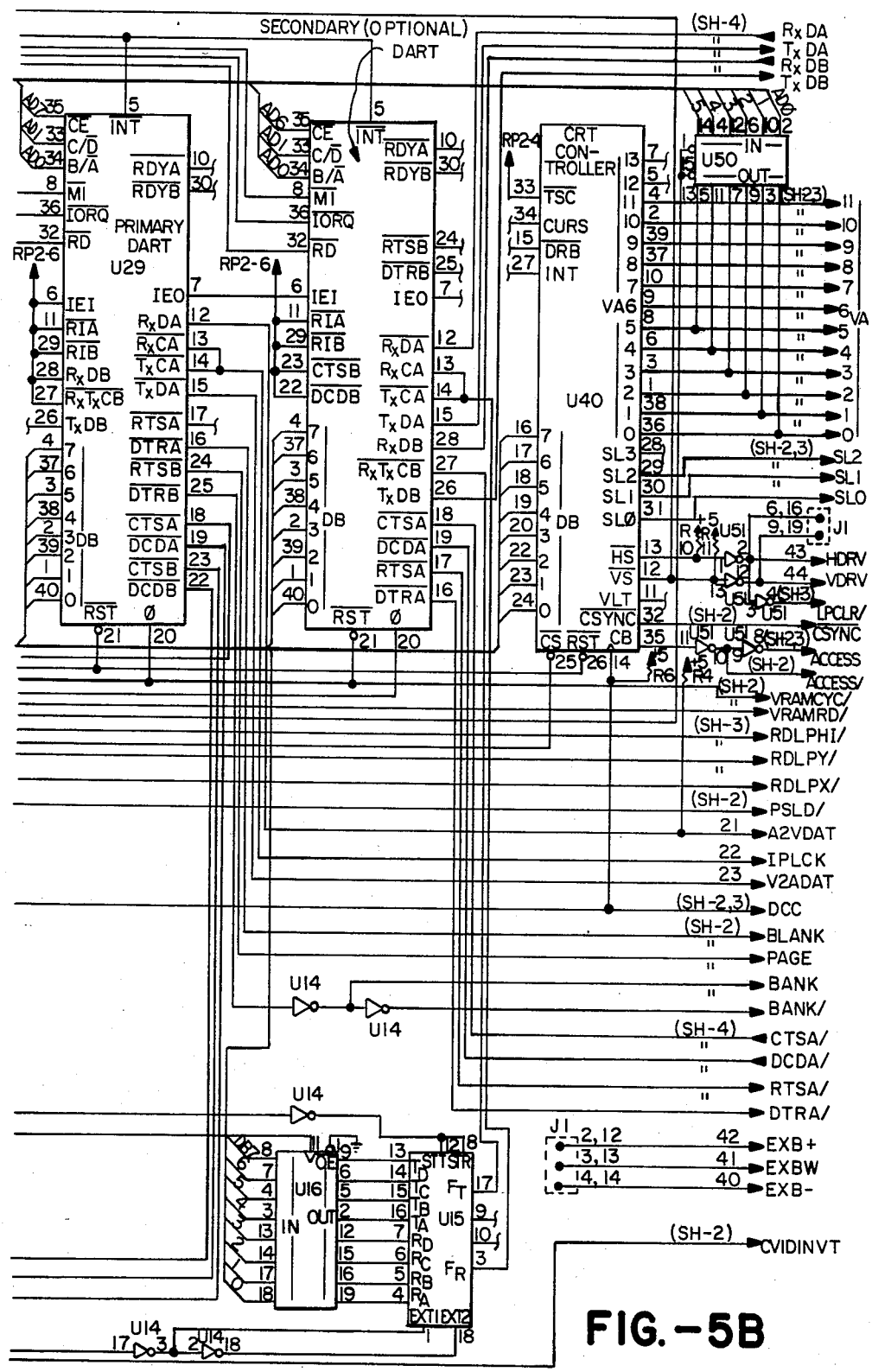
FIG. 5 depicts a schematic diagram of a video processor section which forms a portion of FIG. 4.

Referring now to FIG. 5, the processor section of the video board of FIG. 4 is illustrated in more detail. The video processor is a configuration including five IC devices.

U30 is a Z80B, 8-bit central processing unit which is clocked at 5 MHz (6 MHz limit for the −B part). The Z80 features separate non-multiplexed address and data buses.

U39 is a 27128 "EPROM" which provides 16k bytes of static, non-volatile, erasable memory for all video board program and fixed data storage requirements.

Processor work space memory is provided by U49, a 6116 (or equivalency) 2k byte static RAM device.

The 64k byte address space of the Z80 CPU is decoded, and appropriate device strobe signals generated, by PAL device U38. This device is a type 16L8 PAL which is purely combinatiorial (i.e., no clocks or on-chip registers).

The I/O space, defined by one of the PAL outputs is further decoded by octal decoder U48 (74LS138) to provide individual I/O strobes to the various ports.

This processor configuration uses both the non-maskable (NMI) and the maskable (INT) interrupt capabilities of the Z80. The NMI input is activated by the vertical synchronization output of the CRT controller 68, and allows processor activity (primarily DRB access) to be synchronized to the vertical retrace period.

The INT (maskable) interrupt input is sourced by the "DART" asynchronous communications device 74 and alerts the processor to serial I/O, light pen hit, or external switch activity.

The bus arbitration (BUSREQ/BUSAK) and the memory cycle control (WAIT) capabilities of the Z80 are not used.

The asynchronous serial communications device, U29, provides a full-duplex inter-processor communications channel. In addition, this device provides limited parallel I/O to the video processor for various internal and external function control.

The device, referred to as a "DART" (dual asynchronous receiver/transmitter), provides two independent full-duplex asynchronous channels of which only one (channel "B") is used. Each channel has associated with it two general purpose input lines (CTS,DCD) and two general purpose output lines (RTS,DTR). The input lines, which are used in an interrupt-driven mode of operation, signal light-pen (CTSA), and front-panel switch (DCDA, CTSB, DCDB) operations to the processor. The output lines are used for DRB bank (DTRB) and page (RTSB) selection, and for CRT protective blanking (DTRA) to minimize phosphor "burn."

The CRT9007 CRT controller device, U40, performs the generation of video timing and formatting signals (vertical, horizontal, composite sync and composite blanking) and the generation of address sequences into the DRB array for CRT refresh.

A programmable device, the CRT9007 is initialized upon power-up by the Z80 with parameters which define all video timing and formatting.

Fundamentally, the CRT controller defines all video timing in terms of "character" times. In the video board implementation, the DRB(s) are organized as 8-bit characters (bytes). Pixels are presented to the CRT display at a 10.00 MHz rate; thus the character rate is $10 \div 8 = 1.25$ MHz. The CRT controller is clocked at this 1.25 MHz character clock (DCC) rate, thus all video timing is in terms of 800 ns character times.

The terminal utilizes a 512 pixel (64 character) by 480 line, 2:1 interlaced scan format. Total horizontal formatting consists of 80 characters, thus horizontal retrace is 16 characters (80−64) in duration.

Since 240 lines are displayed per field, and $262\frac{1}{2}$ lines per field are specified in the timing parameters, vertical retrace duration is $22\frac{1}{2}$ lines.

From these parameters, the line rate (HSYNC frequency) is seen to be 15.625 KHz, and the field rate (VSYNC frequency) is calculated as 59.523 Hz.

Video address outputs VA0-5 are also used as address inputs to the CRT9007 during device initialization. Hex 3-state buffer U50 (74LS367) isolates the processor address bus from the VA0-5 lines except during initialization.

Figure 6A:
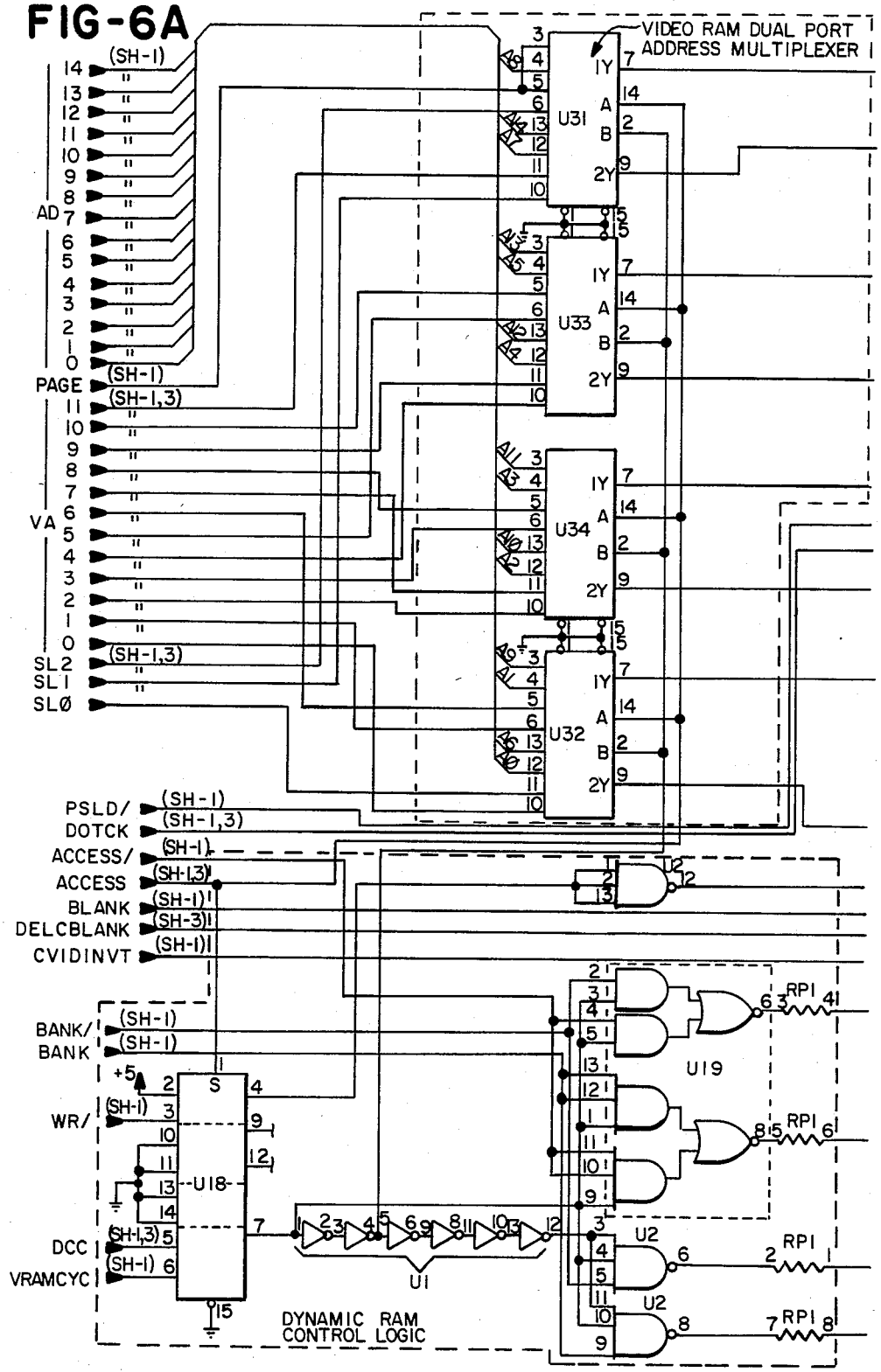
FIG. 6 depicts a schematic diagram of a display RAM which forms a portion of FIG. 4.
Figure 6B:
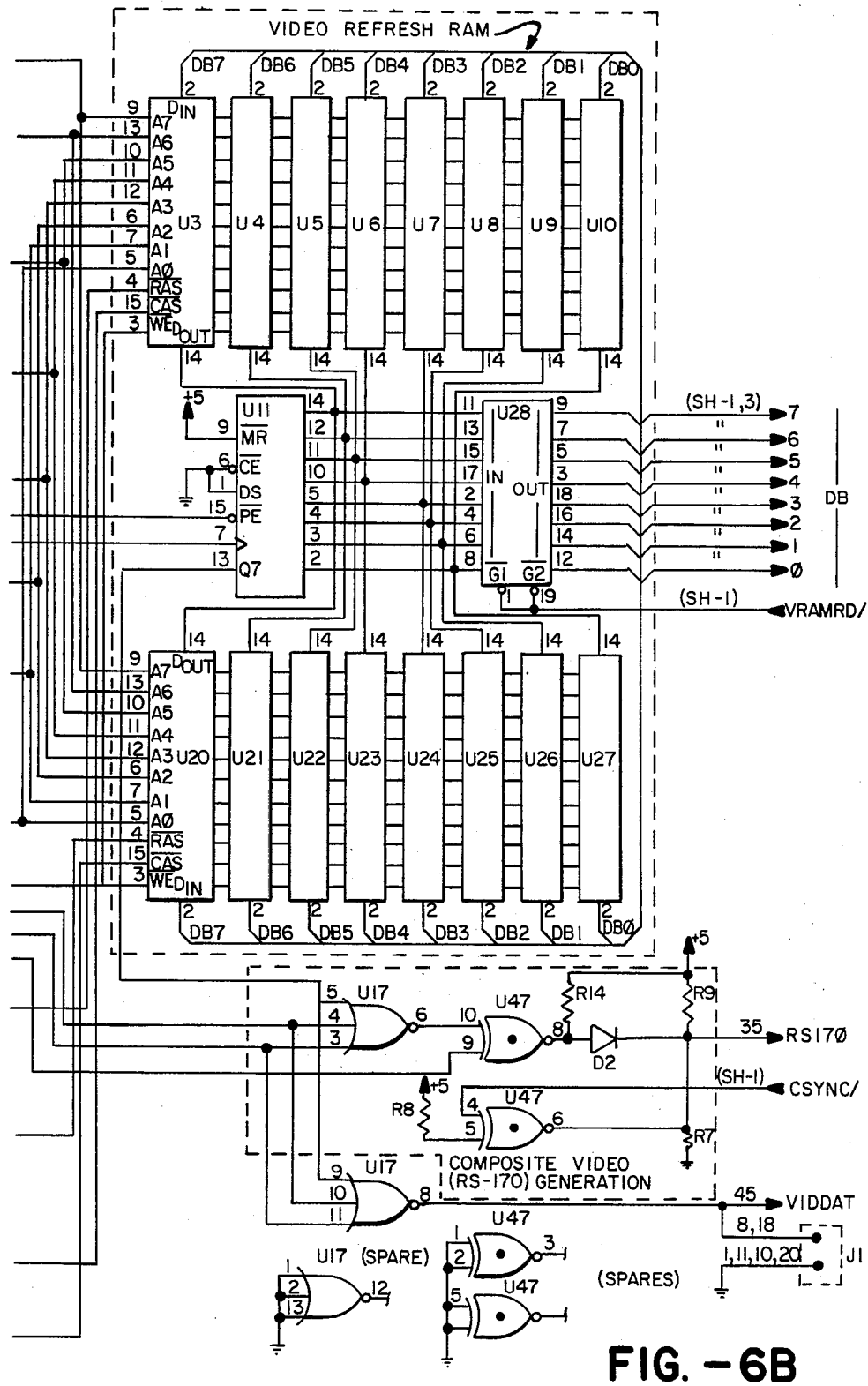

The four "pages" of display refresh buffer RAM depicted in FIG. 6 is logically organized as two "banks" of 64K bytes each. Each bank is implemented as an array of 8 64K=1 dynamic RAM devices (8264 or equivalent). The two banks are addressed in parallel and have their outputs connected in common. All RAM inputs connect directly to the processor data bus. Display RAM outputs are presented to an 8-bit shift register (U11) for parallel/serial conversion of CRT refresh data, or to the processor data bus via buffer U28 during processor DRB read operations.

DRB operation occurs in two distinct modes: (1) processor access mode, which occurs during the vertical blanking period, and (2) CRT refresh mode, which occurs at all other times.

Processor accesses may involve either read or write operations to the DRB array. During the processor access interval, control multiplexer U18, and address multiplexers U31-U34 are switched so as to permit Z80 generated signals to pass to the dynamic RAM array. U18 pin 4 will present the Z80 write (WR) signal to the RAM array if a processor write operation is initiated, and at pin 7 the RAS/CAS timing generator will be triggered when any processor reference to the DRB is made. The 16-bit processor address into the DRB is further multiplexed into 8-bit row and column addresses by the B-select input U31-U34.

CRT refresh operation includes a continuous sequence of DRB read operations to be performed with addresses supplied by the CRT controller. When this mode is active, U31-U34 A-select inputs cause the CRT controller addresses to be passed to the RAM array; row/column sub-multiplexing occurs as before. In this mode, U18 forces the WR output at pin 4 to the inactive state (read-only operation). The RAS/CAS trigger (U18, pin 7) is activated by the character clock in this mode, causing a sequence of read operations to be performed at the character rate.

RAS/CAS timing is performed by a "delay line" implemented as six cascaded inverters (U1). The input to this delay line triggers RAS via and-or-invert gate U19. The two-inverter delay point is used to switch U31-U34 from the row address to column address mode; the full delay of U1 then causes CAS to be activated via U2. U19 and U2 cause the RAS and CAS signals to be distributed to the processor-selected RAM bank (as defined by DART output DTRB). The selected bank receives the RAS and CAS signals during either a processor access or a CRT refresh access; the unselected bank receives only RAS. This causes a normal access to be performed to the selected bank, and an RAS-only refresh to be performed to the unselected bank.

Repetitive memory addressing during CRT refresh mode serves to guarantee dynamic RAM refresh without processor intervention.

Figure 7A:
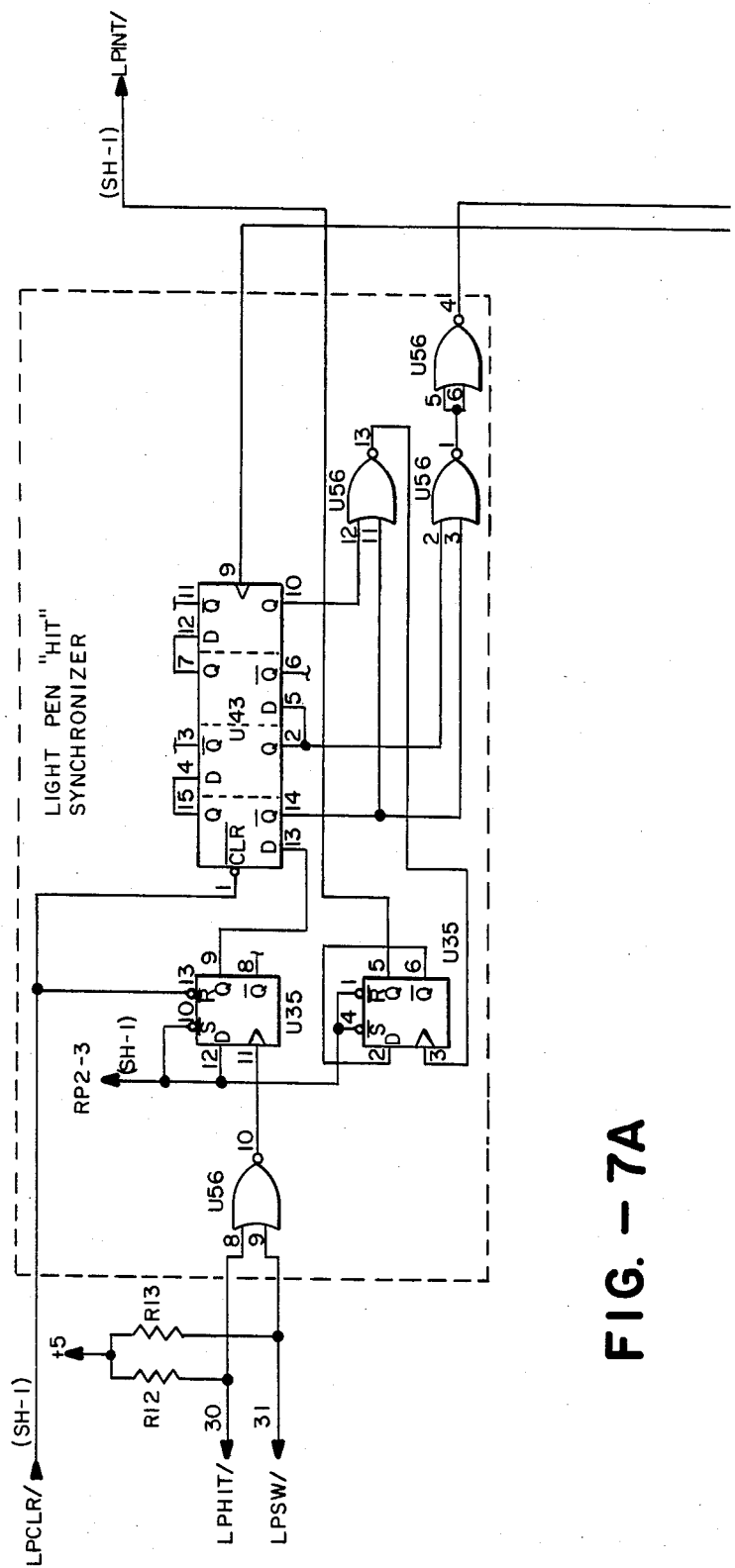
FIG. 7 depicts a schematic diagram of light pen synchronizer/register logic, which forms a portion of FIG. 4.
Figure 7B:
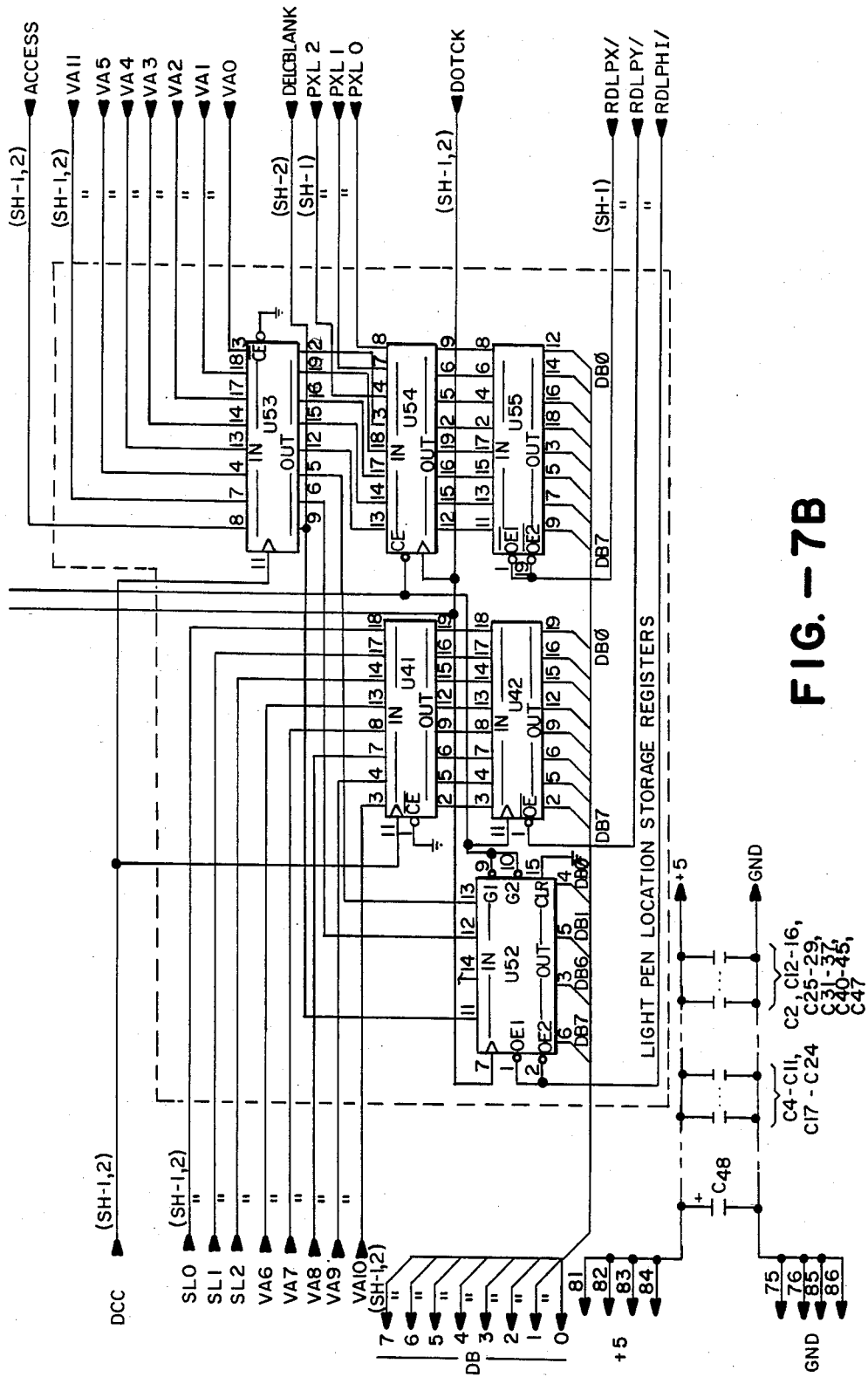

The light pen interface section depicted in FIG. 7 synchronizes the "hit" pulses received from the light pen with the 10 MHz "dot clock" corresponding to the rate at which pixels are presented to the display unit. The conditioned hit pulse (1 only per scan line) is used to strobe current CRT display location defined by the CRT controller address outputs into holding registers for subsequent reading and processing by the CPU. Horizontal position requires 9 bits to represent the 512 displayed pixels per line. Similarly, vertical position required 9 bits to specify one of 480 displayed scan lines. Light pen position data is read by the processor as three input port locations: two contain the low-order eight bits of the horizontal and vertical position values, while a third port supplies the high-order H and V bits, as well as a "BLANK" bit. This latter bit is checked by the processor to ensure that a recorded hit does not, due to light pen and synchronizer delays, correspond to a horizontal position of greater than 512 pixels.

The H position register consists of U54 in conjunction with 3-state bus buffer U55. V-position is contained in octal register U42, and the high-order position register is comprised of U52.

Prior to being strobed into the position registers, the H and V address information is latched every character time by registers U53 and U41, respectively. This prevents possible erroneous locations from being recorded as a result of the CRT controller address outputs coming in and out of a high-impedance condition at the beginning and end of scan lines.

The HIT and SWITCH signals from the light pen are combined by NOR gate U56 and latched by D-flop U35. The resulting asynchronous edge is applied to a cascade of four D-flops (U43) clocked at the 10 MHz pixel rate. This arrangement performs the synchronization function with good immunity to metastable behavior. The synchronizer output, in conjunction with other sections of U56, form a 100 ns wide (single pixel) strobe pulse to the position registers. The pulse also toggles a T-flop (other section of U35) which generates an edge to the DART light pen input (CTSA) for every light pen hit received.

Synchronizer circuitry is cleared by the HSYNC pulse, thus guaranteeing that only one hit will be accepted per scan line.

Referring again to FIG. 4, an audio board section 52 will now be described.

Like the video board 50, the audio board 52 is a Z80 based processor 80 which executes the real-time functions associated with speech and modem algorithm execution.

The block diagram shown in FIG. 4 illustrates the major functional components of the audio board, which includes:

(1) A Z80B processor 80 configuration incorporating a 8k byte EPROM 82 and 2k byte static RAM 84. The processor is clocked at the maximum 6 MHz rate.

(2) Asynchronous serial communications channel 72 for interprocessor (video board/audio board) communications.

(3) Dual LSI Codec (coder-decoder) configuration to support voice bandwidth A/D and D/A functions for both speaker/microphone and telephone transmit/receive signal paths.

(4) Three identical FIR digital filter arrays 90, 92, 94 implemented with a bit-serial arithmetic structure. Each filter includes a 64-sample (16-bit samples) digital delay line and supports up to 32 coefficients stored with 8-bit precision (alternate tap coefficients are presumed zero which yields an effective filter length of 64).

(5) Digital filter control circuitry using programmable array logic devices.

(6) Analog support circuitry: microphone amplifier, limiter, codec output buffer amplifiers, audio output power amplifier.

All audio board I/O is via an 86-pin P.C. edge connector.

Figure 8B:
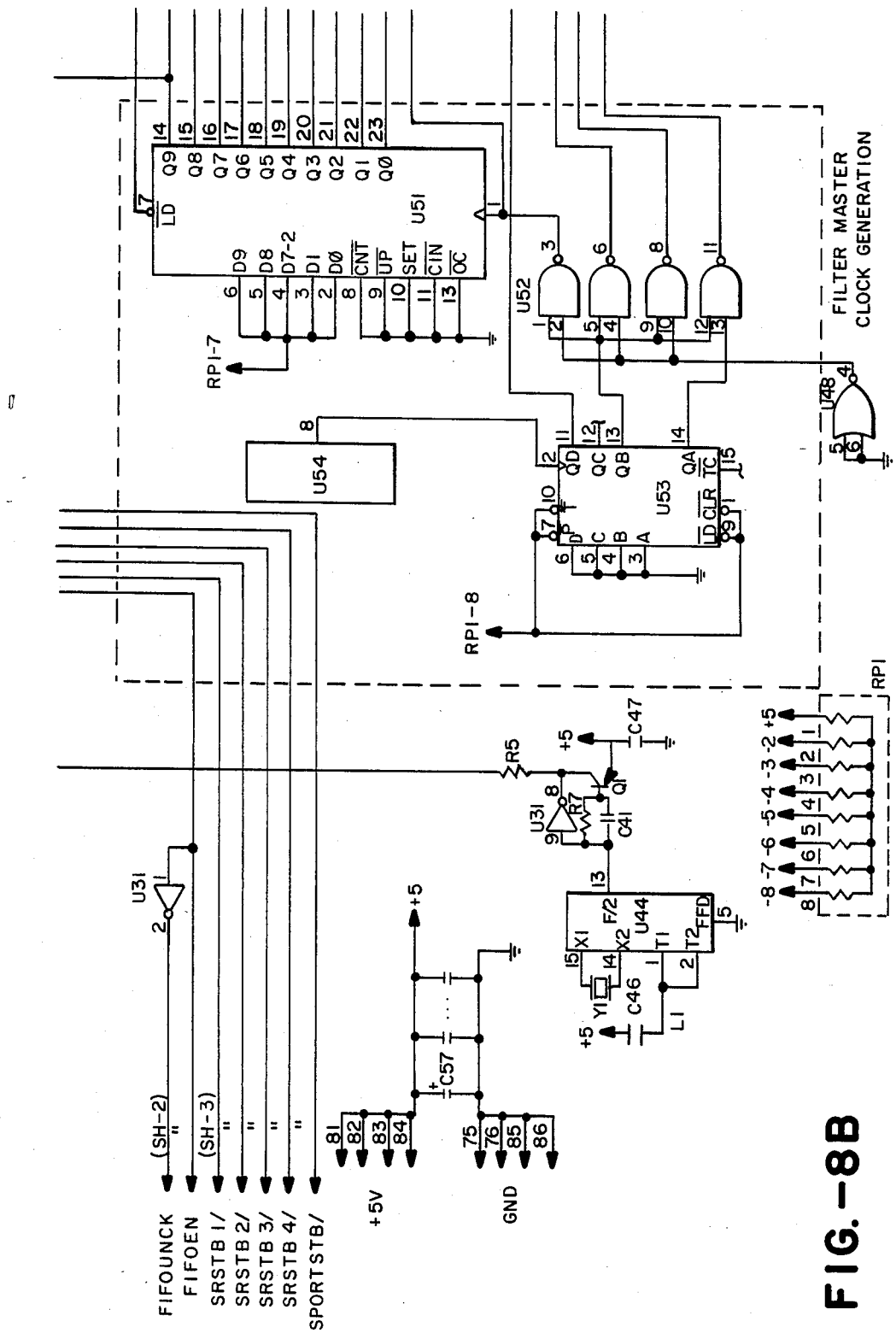
FIG. 8 depicts a schematic diagram of an audio processor section which forms a portion of FIG. 4.
Figure 8C:
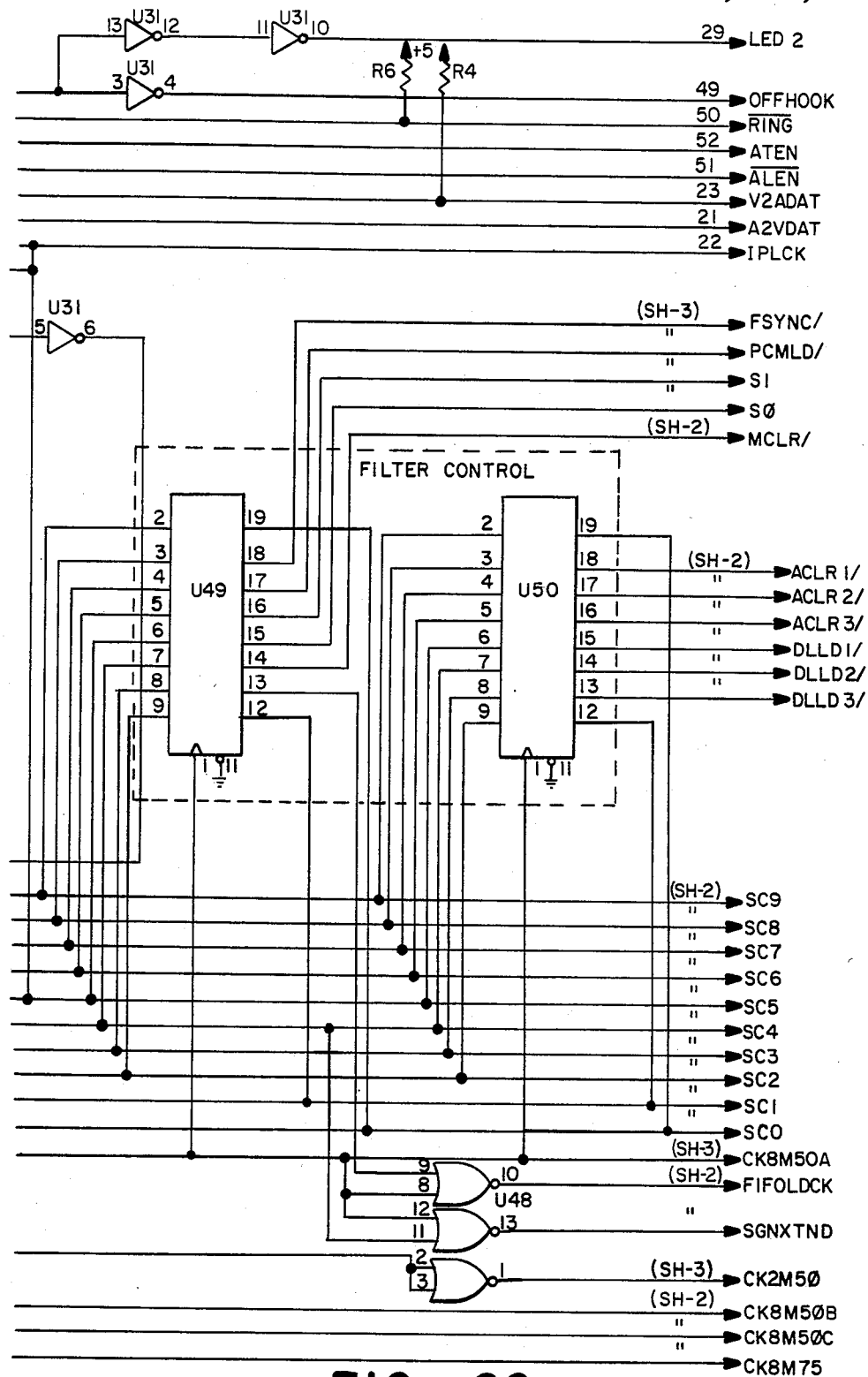

Referring now to FIG. 8, the processor section of the audio board 52 of FIG. 4 is depicted. The processor configuration on the audio board 52 is virtually identical to that described for the video board 50. Since only one device (the DART serial communications device) exists in I/O space, the I/O decoder used on the video board is omitted on the audio board. Also, the EPROM will normally be the 2764 type 8K×8 device, although the socket can be wired to accept the 27128 if necessary. The Z80B processor (U1) and 6116 static RAM (U29) are the same as in the video processor. Also, a 16L8 combinatorial PAL (U2) is used to decode the processor memory address space.

Processor clock generation is achieved identically to the video processor; a crystal-controlled oscillator (U44) operating at 12 MHz is divided by two (internal to U44) and feeds a clock driver circuit consisting of R5, R7, RC41, Q1, and one inverter section of U31.

The audio processor environment utilizes the non-maskable (NMI) interrupt in a free-running mode at the sample rate (8 KHz). The INT interrupt to the Z80 is connected to the DART device, but is not activated as the DART is operated in a polled mode.

Again in the audio processor, memory cycle control and bus arbitration are not used.

A "DART" asynchronous receiver/transmitter device (U30) provides a serial interprocessor communications channel as in the case of the video board. On the audio board, however, channel A of the DART is used rather than channel B. Also, the general-purpose I/O lines of the DART are used for various on- and off-board control functions. Control function including specific DAA (Data Access Arrangements) control functions are DAA hookswitch state; DAA attenuator enable/disable; DAA analog loopback enable/disable; Audio board timing generator runstate (enable/disable); and DAA ring indicator.

The baud rate clock for both audio and video board DART devices is derived from an audio board timing generator (to be described later) and is at a frequency of 128 KHz. The DARTs are programmed to expect a 16 times baud rate clock; thus the baud time on the interprocessor channel is 125 us. A complete serial character thus requires 1.25 ms to transmit over the serial channel (including start and stop bits).

Figure 9B:
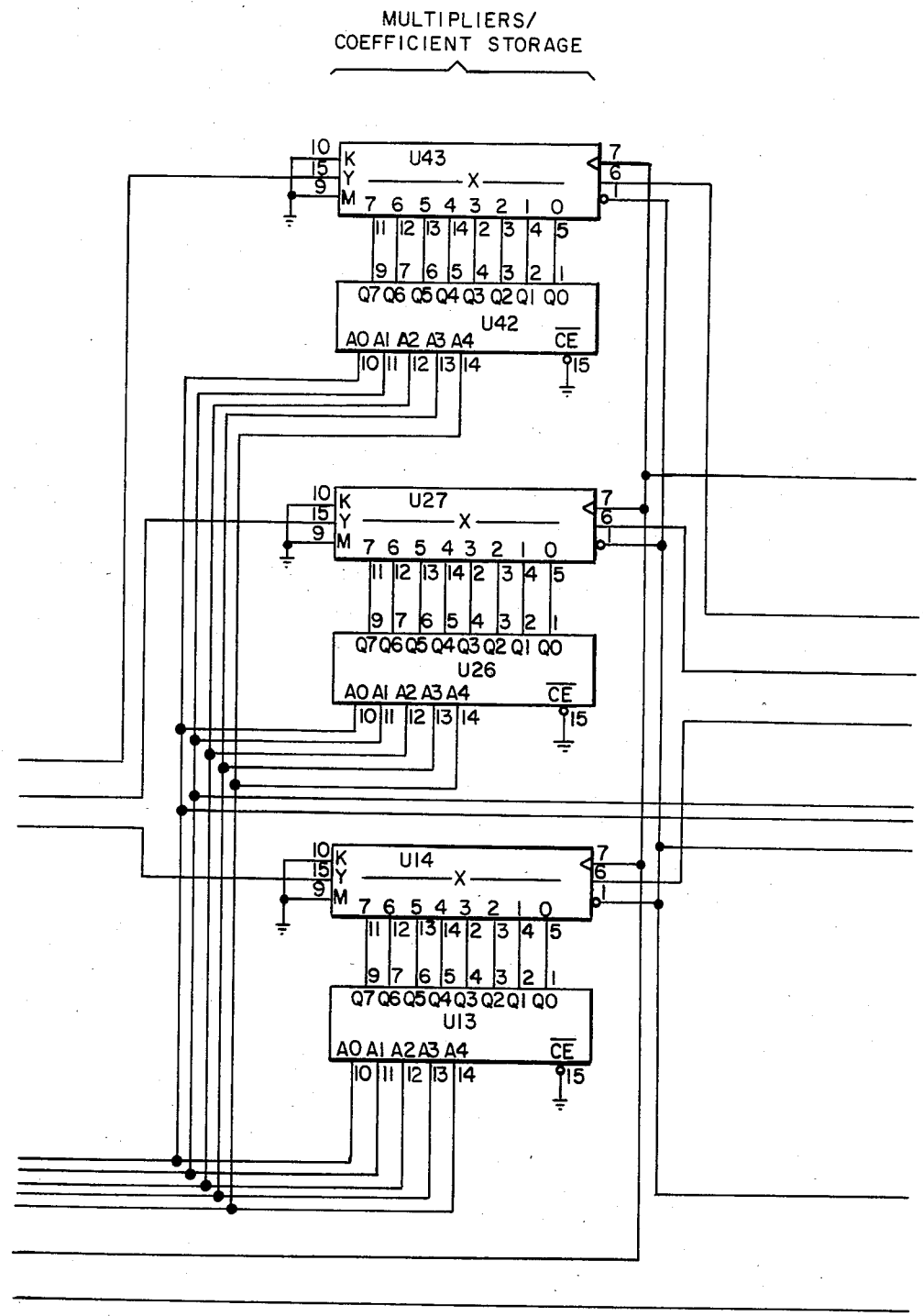
FIG. 9 depicts a schematic diagram of digital filters which form a portion of FIG. 4.

The digital filter circuitry depicted in FIG. 9 includes three identical filter implementations all operating concurrently (although with staggered timing as will be discussed more fully below). For purposes of discussion, the filter composed of devices U38, U39, U40, U41, U42 and U43 will be described, although U22–U27 and U9–U14 comprise fully equivalent filters.

Devices shared by all three filters are U15, U28, U8, U5, U4 and U3.

Data storage and arithmetic computation within the filter occurs in a bit-serial format, except for coefficient storage which is in an 8-bit parallel format.

Basic filter components consist of a 1024-bit serial shift register implemented with a 1K=1 high-speed static RAM (U41), a 16-bit shift register (U40) in the recirculation path of the 1024-bit shift register, an "8-by-1" serial-parallel multiplier device (U43), a 32 byte bipolar PROM for coefficient storage, and a 32-bit serial shift-register "accumulator" for filter output temporary storage (U38, U39). Additionally, one section of a four-bit latch (U28) is used for sign extension of the sample values presented to the multiplier/accumulator circuitry, and a section of programmable array logic device U8 provides the serial "carry-save" adder function.

Sixteen bit data samples are stored serially in the 1K×1 static RAM. Sixty-four consecutive samples thus exist in the RAM at any time. The sixteen-bit shift register in the recirculation path causes RAM data to shift position by 16 locations (or one sample) during each filter computation, thus effecting a delay-line mode of operation. Furthermore, the recirculation shift register features a two-input multiplexer at its input; thus the newest sample may be input at this point while the oldest sample is shifting out of the RAM.

The "shifting" of RAM data occurs at the basic filter bit rate of 8.192 MHz. The RAM is made to appear as a shift register by performing a "read-modify-write" operation at each sequentially-addressed location. The write pulse occurs during the last 31 ns of each bit time; the delay introduced by Schmitt inverter V15 serves to eliminate a potential race condition.

Delay-line output samples are sign-extended to 32-bits by U28. This "masks" alternate output samples and effectively sets alternate coefficients of the 64-tap filter equal to zero. The serial-parallel multiplier operates on the sign-extended 32-bit input values and generates 32-bit products. The 8-bit multiplicand (coefficient) is obtained by sequential addressing of a 32×8 bipolar PROM (U42). Since the input samples are confined to 16-bits, right-justified, and the coefficient are represented by 8-bits, product values reside in the rightmost 24 bits of the 32-bit output. This provides at least a 7-bit margin for word growth in the accumulator.

Product terms are summed with the output of a 32-bit serial accumulator by a "carry-save" serial adder implemented as a portion of programmable array logic device U8. U8 actually implements three such adders (1 per filter) and also implements a 3-to-1 multiplexing of the adders output streams. Briefly, the PAL used (16R4) provides four combinatorial and four registered outputs. Each adder uses one combinatorial output for sum generation and one registered output for the carry function; the carry output is used as a feedback term to the PAL input array.

The accumulator output is zeroed at the beginning of each filter computation cycle (125 us).

Operation of the 3 filters is staggered in increments of one-quarter of the filter computation cycle (31.25 us). This allows the filter outputs to be time-multiplexed on a single PAL output line. The multiplexed serial output stream is converted to a parallel format by an 8 bit shift register U5. The resulting 8-bit parallel data is presented to the input of a 16×8 FIFO array composed of two 16×4 FIFO devices (U3, U4).

At appropriate times during the filter computation cycle pairs of 8-bit values representing the outputs of the three digital filters are strobed into the FIFO. A total of six values are thus loaded into the FIFO during each computation cycle.

The FIFO values representing the filter output results are available to be read by the processor at any time during the 125 82 s NMI interval.

Figure 10A:
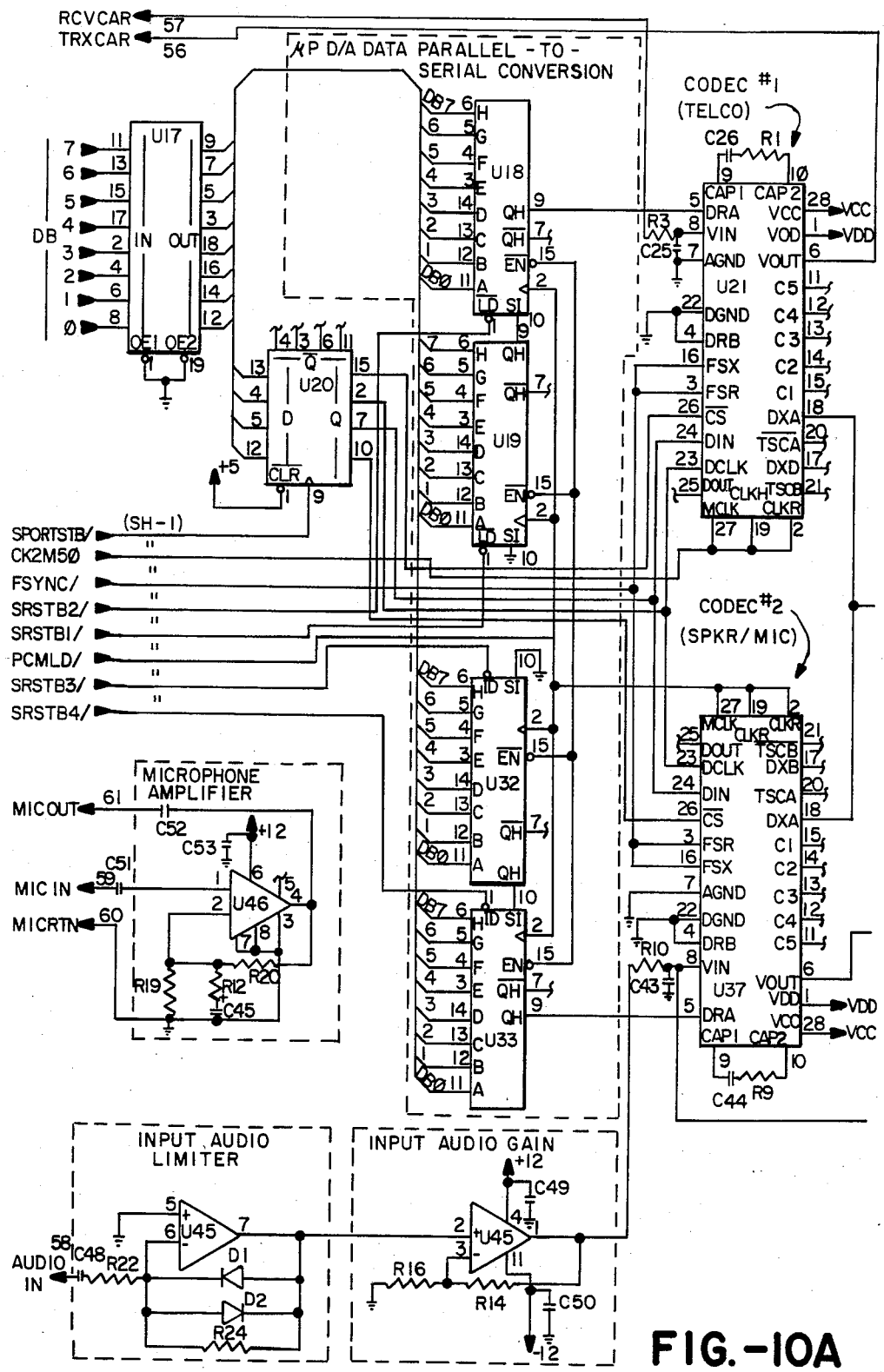
FIG. 10 depicts a schematic diagram of codec/analog circuits which form a portion of FIG. 4.
Figure 10B:
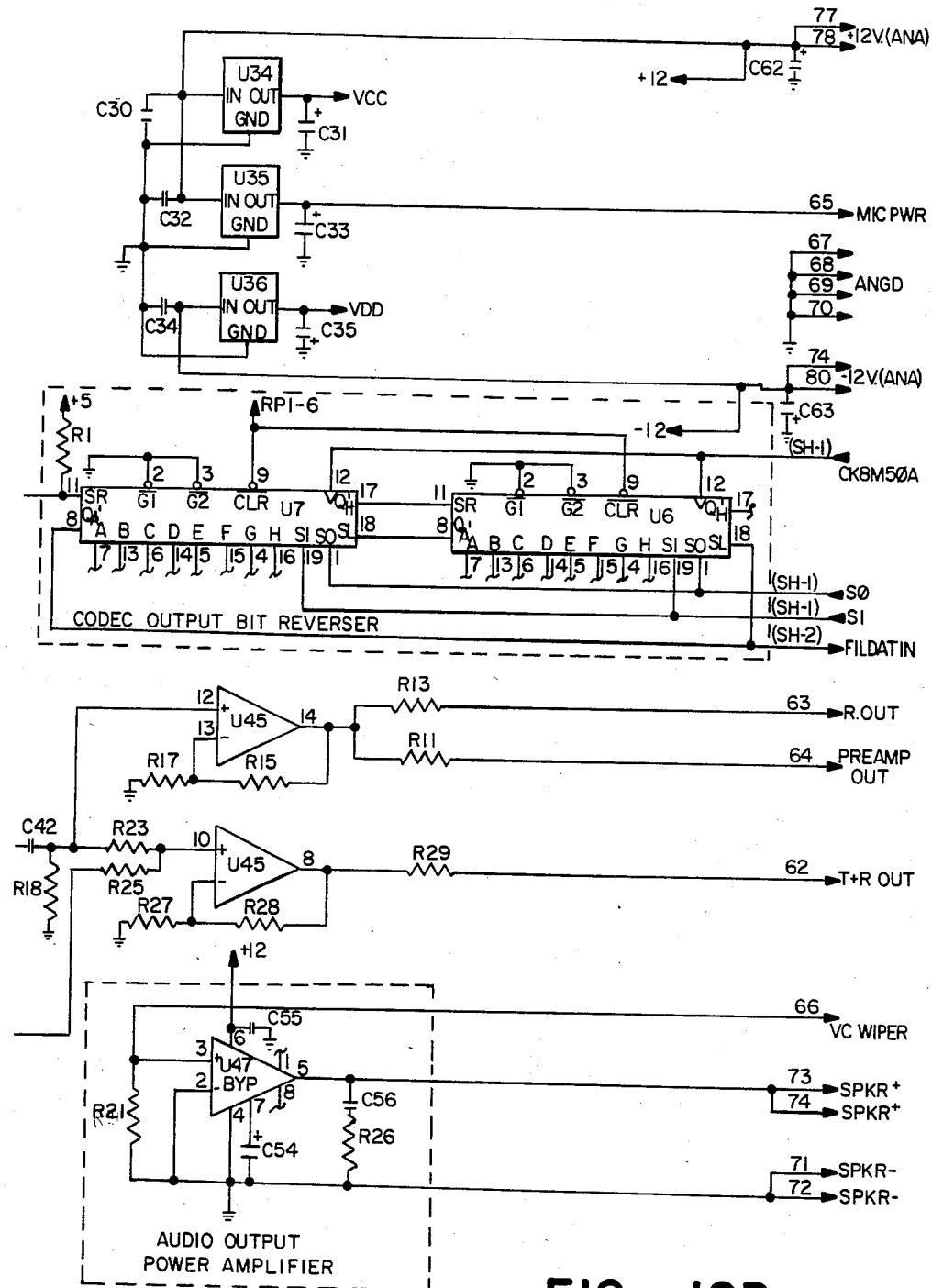

Referring now to FIG. 10, analog-to-digital (A/D) and digital-to-analog (D/A) conversion functions are performed by two AMD 7901 single-chip codecs. Each codec performs the A/D and D/A function simultaneously; one codec handles the speaker/microphone interface function, while the other codec interfaces to the telco transmit/receive paths. The codec devices include the A/D pre-filtering (antialias) and D/A reconstruction filtering functions.

Codecs are optimized for ease of interface to serial PCM channels, thus both the D/A digital input and A/D digital output are provided in a 16-bit bit-serial digital format. The 7901 codecs are supplied with separate clock inputs to control input (D/A) data shift rate (CLKR), output (A/D) data shift rate (CLKX), and internal processing (MCLK). In the audio board implementation, all of these clock inputs are tied to a 2.048 MHz clock source.

Each codec is supported by an external 16-bit shift register (U18, U19 and U32, U33) which serializes the 16-bit values presented by the processor for conversion during each 125 μs sample interval. These registers are enabled for shifting serial data into the codecs during the first 16 clock times (CLKR=2.048 MHz) of each sample interval (7.8 us). At all other times, the shift registers are available for receiving new data from the processor.

At the output side (A/D), the 16-bit serial values must be conditioned in two ways before being applied to the digital filter hardware: the samples must be reversed from an MSB-first to LSB-first format, and the shift rate must be increased from 2.048 MHz to 8.192 MHz. These functions are performed by the 16-bit bidirectional shift register formed by U6 and U7. Since the time at which A/D samples are output by the two codecs is staggered (achieved by initializing different transmit time slot values into the codecs), the bit-reversal circuit may be shared by both codecs.

The codecs are initialized by the processor at power-up via a bit-serial command sequence. A four-bit parallel port (U20) provides the signal lines necessary for the serial control interface. This port allows initialization software to generate the serial data bits (DIN), and data clock (DCLK) necessary to program the 7901's, as wall as separate chip selects to each codec.

All control of the digital filter and codec hardware is derived from a master oscillator and divider network. Oscillator U54 operates at 32.768 MHz and drives modulo16 counter U53. The counter outputs in conjunction with gate U52 provide three 8.192 MHz square wave clocks (CK8M 50A,B,C) and a 8.192 MHz clock with a 75% duty cycle (CK8M75) for the operation of the static RAM shift register circuitry.

A 10-bit counter, U51, is clocked by CK8M50A and defines the 125 us sample interval. All sequential filter activity (RAM shift register operation, coefficient look-up, sign extension) are controlled directly by appropriate outputs of the 10-bit counter.

Additionally, the counter outputs are decoded by two programmable array logic devices (U49, U50) to generate the more complex timing signals required. PAL U50 generates the new sample load signal for the three digital filter delay lines (DLLD1-3) as well as the accumulator clear controls (ACLR1-3).

Device U49 generates the following miscellaneous control signals: (1) FSYNC, the time slot timing reference for the codec devices; (2) PCMLD, which enables samples to be shifted into the codecs for D/A conversion; (3) S0 and S1 which control the bi-directional shift register to implement the bit-reversal and shift rate conversion functions; (4) MCLR, which clears the serial/parallel multipliers after each product has been computed; and (5) FIFO, which defines the "pickoff" points used for strobing filter output data into the FIFO's.

In FIG. 10, an LM387A dual low-noise amplifier (U46) serves as the microphone amplifier. The device is used in a non-inverting configuration with a gain of approximately 80. The output is AC-coupled to remove the half-supply (6 volt) output bias.

Also provided is a separate +5 volt regulator (U35) which is used to provide operating voltage for the electret microphone element.

The audio power amplifier used is the LM386 (U47). This device is used in the standard configuration described in the applications literature, and is capable of providing approximately one-half watt of audio output power.

Audio input signals (either the amplified internal microphone signal or external audio input) is limited to approximately 1 volt peak-to-ground by one section of operational amplifier U45. The limiting action is "soft" to minimize harmonic generation, and begins at approximately 0.7 volts peak-to-ground. The limited signal is then amplified by a non-inverting gain stage using another section of U45. Gain of this amplifier is established at three. The audio signal is then presented to the codec for A/D conversion. A single-pole RC low-pass filter (R3, C25 and R10, C43) is used at each codec input for RFI suppression.

The analog output from the telco codec is presented directly to the DAA transmit signal input (TRXCAR). Speaker analog output from the speaker/mic codec is DC-blocked by C42, R18, and presented to two amplifiers (U45). One acts as a unity-gain buffer and provides the external "ROUT" signal as well as drives the volume control potentiometer for the internal speaker amplifier.

The other section of U45 is configured as an inverting summing amplifier and combines the processed audio input signal (at codec U37 pin 8) with the speaker analog output signal (at U37 pin 6). This provides the external "T+R OUT" output signal.

ILLUSTRATIVE CYCLE OF OPERATION

In order to illustrate a cycle of operation and explain in more detail the audio and video processor software, the following sequence of events will be explained in detail with the aid of FIGS. 4 and 1113:
* Taking the phone off hook
* Dialing
* Transmitting using the modem (taking the pen)
* Drawing locally and transmitting the drawn images across the modem
* Ending modem transmission (giving up the pen)
* Placing the phone on hook Before explaining the above outlined sequence of events, the speed and data handling capabilities of the audio processor will be discussed. The audio board contains three digital filters implemented in hardware which condition incoming speed and data from the telco network and from the microphone. These filters are shown in FIG. 4. The outputs of these filters are available through a hardware FIFO to the audio processor code each 8 KHz NMI. The BAND REJECT TRANSMIT filter places a notch in the microphone speech to allow a window for the transmit modem data. When the audio processor is modulating a bit stream from the video processor, the corresponding modulation data is added to the output of the BAND REJECT TRANSMIT filter before the microphone speech is placed on the line. The BAND REJECT RECEIVE notches out the data signal so that its output is the speech portion received from the telephone line. The output of this filter is written to the speaker DAC when the audio processor speech algorithm is in RECEIVE MODE. The BANDPASS RECEIVE filter output is the data portion of the data and speech from the telco network. The output samples from this filter are used for demodulation.

Figure 11:
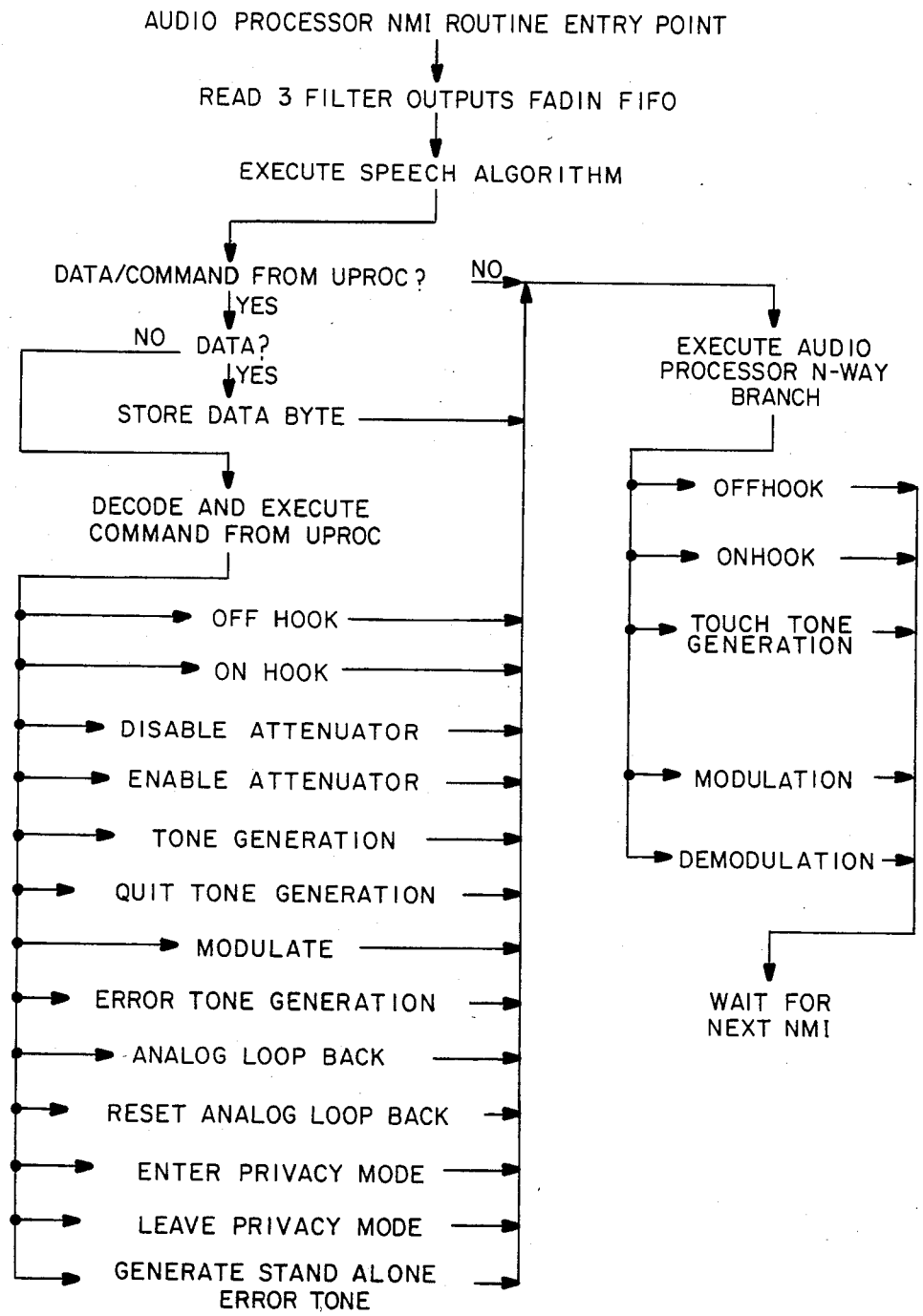
FIGS. 11-13 depict flow diagrams for illustrating a cycle of operation of the present invention.

The audio processor flow diagram depicted in FIG. 11 shows that the speech algorithm always gets executed each 8 KHZ audio NMI. The speech algorithm is the speakerphone code and through various thresholding tests determines when and how long to write received speech to the speaker DAC and/or transmit speech from the microphone to the line DAC.

Figure 12:
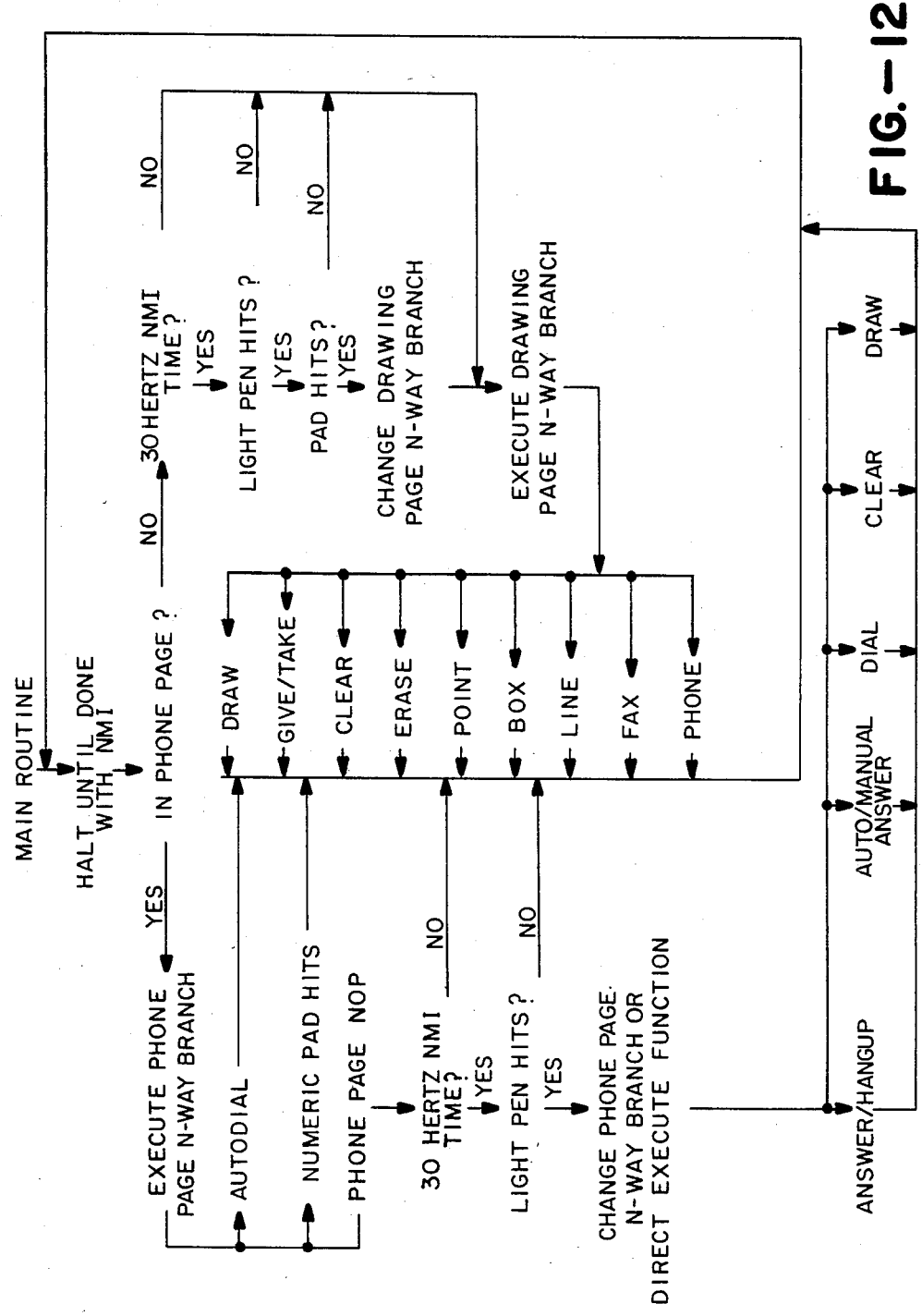

In order to take the phone off hook, the light pen must be touched on the ANSWER pad when the phone page is displayed on the video screen. As shown in FIG. 12, the video code makes the phone page branch and checks to see if there are any light pen hits. Since there is a hit, the hit is decoded and the ANSWER/HANGUP code is entered. The ANSWER/HANGUP code changes the wording of the ANSWER pad on the phone page to HANGUP, which is now the pad's new function. The ANSWER/HANGUP code also sends an OFF HOOK COMMAND to the audio processor via the DART shown in FIG. 4.

The read character receive register is interrogated every other 8 KHZ NMI in the audio processor. If the OFF HOOK COMMAND is detected then the audio processor commands the DIRECT CONNECT PROTECTIVE HYBRID or DCPH to take the phone off hook. The audio processor also places itself in CARRIER DETECT MODE which is a subset of DEMODULATION MODE shown in FIG. 11.

Now that the phone is off hook, a user may begin dialing. Dialing is initiated by touching the light pen to any of the numeric touch tone pads on the video screen when the phone page is being displayed. The touch tones are made up of two frequencies. The frequencies are generated in the audio processor by means of a lookup table. When a numeric pad is touched with the light pen the video processor sends a TOUCH TONE GENERATION COMMAND followed by two datums of frequency offset values to the audio processor. In response to this command and data offsets, the audio processor places itself in TOUCH TONE GENERATION MODE and begins generating touch tones. The audio processor sends these touch tone values to the phone line and to the speaker. The audio processor will continue to generate these touch tones until it receives an explicit QUIT TONE GENERATION COMMAND from the video processor. The video processor does not send the QUIT TONE GENERATION COMMAND to the audio processor until the light pen is released from the phone page numeric pad. In response to QUIT TONE GENERATION COMMAND the audio processor removes itself from TONE GENERATION MODE and places itself in in CARRIER DETECT MODE.

After touching an appropriate sequence of numeric pads on the phone page, a complete number is dialed and a connection to another terminal or an ordinary phone may be made. In order to draw to another terminal the transmitting unit must first be in one of the three drawing pages. This is accomplished by touching the light pen to the DRAW pad while in the phone page. The video processor decodes the phone page DRAW pad hit and causes one of the drawing pages to be displayed. Once a drawing page is displayed a user may command the terminal to go into TRANSMIT MODE.

The left hand control pad on the bottom of any of the three drawing pages is TAKE. Touching the light pen to the TAKE pad causes the pad to change to GIVE and also causes the right hand PHONE pad to change to the word TRANSMIT. In addition to the pad wording changes, the video processor is placed in TRANSMIT MODE and a BEGIN MODULATION COMMAND is sent to the audio processor. In response to the BEGIN MODULATION COMMAND the audio processor generates and sends a ½ second duration 2 KHZ frequency echo suppressor disabling tone. Immediately following this tone, the audio processor modulates a 2 KHZ carrier with a pre-defined 32 bit preamble followed by an 8 bit sync word. After the modulation of the sync word the audio processor begins modulating the carrier with data sent to it from the video processor.

The audio processor maintains a memory resident 16 bit modulation queue. The bits in the queue are used to modulate the carrier. Whenever the number of bits in this queue drops below eight the audio processor sends an AUDIO ACKNOWLEDGE byte to the video processor across the DART. When the video processor receives the AUDIO ACKNOWLEDGE byte it sends eight bits of coded information to the audio processor across the DART for modulation.

Figure 13:
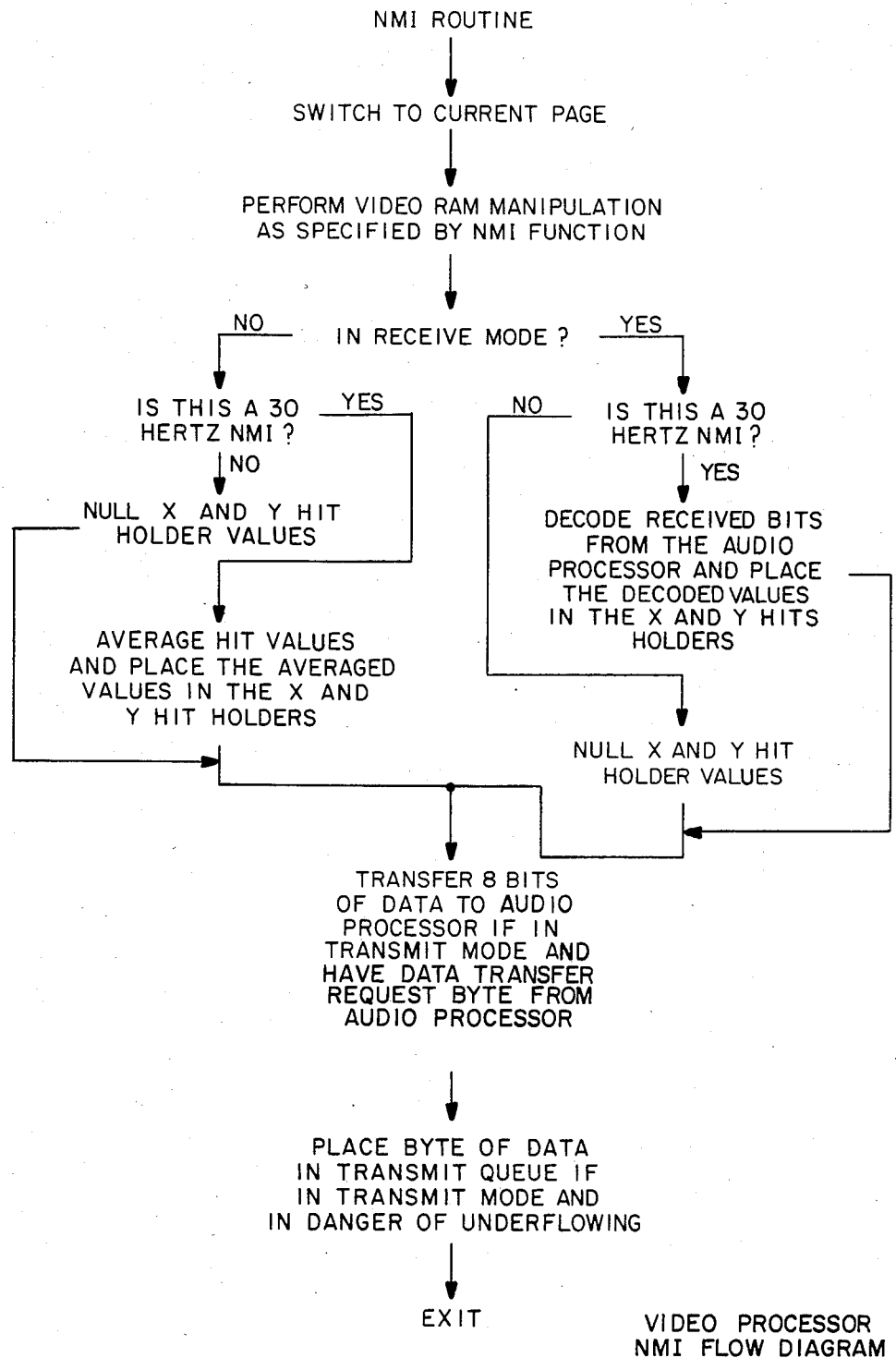

When the video processor is in TRANSMIT or LOCAL MODE, all screen manipulation commands are generated by touching the light pen to a control pad or by drawing with the light pen on any one of the three drawing pages. When the video processor is in RECEIVE MODE, all screen manipulation commands and screen drawing is derived from decoding the bit stream from the modem link via the DART from the audio processor. This separation is illustrated in FIG. 13.

Now that the pen is taken, drawing from the transmitting device to the receiving device may be accomplished. All of the video code which handles local operations such as drawing, erasing, clearing the screen, etc., also has code to encode these operations into commands and data to be sent across the modem link. The code that generates and sends these commands and data is enabled to operate only when the pen is taken and the video processor is in TRANSMIT MODE. This means that the transmit side of the modem is dispersed throughout all of the local operation routines in the video code. There are some common points of the transmit code and two of them are shown in FIG. 13. They are the byte transfer code to the audio processor and the underflow code which inserts non-operation codes (NOPS) into the modulation bit stream when the pen is idle.

When drawing on the surface of the screen on one of the drawing pages the light pen hits are averaged every other NMI at a 30 HZ rate. These averaged hits are encoded and sent across the modem link. On both the transmitting and receiving units, the averaged hits are sent to a linear interpolator routine which turns the spaces between the hits into line segments. The output of the linear interpolator is then sent to a moving average filter routine which smooths out the resulting line segments to make the drawn image more continuous.

The output of the moving average filter is a list of elements which are displayed on the video screen during vertical sync time. The video processor only has access to the bit mapped screen ram during vertical sync time.

When the transmitting device is done drawing and the user wishes to give up the pen the light pen should be touched to the GIVE (formerly TAKE) pad. Touching this pad causes the GIVE word on the pad to change to TAKE and causes the word TRANSMIT in the lower right to change to the PHONE pad. Also, the audio processor is commanded to cease modulation and place itself into CARRIER DETECT MODE.

Meanwhile, when the receiving device detects the GIVE COMMAND it removes itself from RECEIVE MODE and places itself into CARRIER DETECT MODE.

To hang up the device, a user presses the light pen to the PHONE pad. This pad hit is decoded and causes the video processor to display the phone page. Touching the HANGUP pad commands the audio processor to command the DCPH to place the phone line on hook.

Although a preferred embodiment of the present invention has been described, other variations are of course possible. For instance, in another embodiment, the present invention could be incorporated with a digital telephone PBX thereby obviating the need for converting data between digital and analog formats. In addition, the present invention could be utilized to permit graphics only transmission, utilizing the telephone accessing scheme described above. It is intended therefore that the scope of the present invention only be limited by the accompanying claims.

What is claimed is:

1. An integrated audiographics communications system comprising
   a common telephone line,
   a plurality of audiographics telephone terminals connected to said common telephone line, each of said terminals including
   means for dialing a telephone number to establish a single telephone connection between two or more of said terminals,
   display means,
   light pen means for enabling a user to visually write text or draw graphics information on said display means,
   means for simultaneously transmitting and receiving data over only said signal telephone connection, said data including spoken audio information and digital text or graphics transmit information,
   said display means including means for visually displaying said received text or graphics data, thereby providing a common display between said terminals having an ordinary telephone connection to one another,
   an integrated speakerphone for providing an audio speech signal corresponding to said spoken audio data simultaneously with the visually displayed text or graphics data,
   means for generating said digital graphics transmit information corresponding to said written text or drawn graphics information, and
   audio means for generating audio transmit information corresponding to spoken audible information.

2. A system as in claim 1 including video processing means for processing said graphics data and audio processing means for processing said audio data.

3. A system as in claim 2 wherein said audio means includes digital filter means for filtering said audio data.

4. In an integrated audiographics system including a plurality of audiographics telephone terminals connected to a common telephone line, each of said terminals comprising
   means for establishing a telephone connection with one or more of said terminals,
   display means,
   light pen means for enabling a user to visually write text or draw graphics information on said display means,
   means for transmitting data over said common telephone line to another one of said terminals, said data including audio and text or graphics information,
   means for receiving said transmitted data over said common telephone line from another of said terminals,
   said display means including means for visually displaying said received text or graphics data thereby providing a common visual display between said terminals having a telephone connection to one another, and
   an integrated speakerphone for providing an audio signal corresponding to said received audio data simultaneously with said displayed text or graphics data.

5. A system as in claim 4 wherein each of said terminals include
   means for generating graphics transmit data corresponding to said written text or graphics data,
   means for generating audio transmit data corresponding to audible data, means for combining said audio and text or graphics transmit data, and means for transmitting said combined data over said telephone line to one or more of said terminals.

6. In an integrated audiographics system including a plurality of audiographics telephone terminals connected to a common communication line, each of said terminals comprising display means for visually displaying text or graphics data, light pen means for enabling a user to visually write text or draw graphics information on said display means, means for generating text or graphics digital transmit information, means for generating audio digital transmit information, means for dialing an access number to establish a connection over said communication line between two or more of said terminals, means for transmitting and receiving digital data over said common communication line, said digital data including audio and text or graphics information, display means for visually displaying said received text or graphics digital data thereby providing a common visual display between said terminals having a telephone connection to one another, means for converting said digital audio data to analog data, and an integrated speakerphone for providing an audio signal corresponding to said receiver audio analog data.

7. An integrated audiographics communication system comprising a common telephone line, a plurality of audiographics telephone terminals connected to said common telephone, each of said terminals including means for dialing a telephone number to establish a telephone connection between two or more of said terminals, display means, light pen means for enabling a user to visually write text or draw graphics data on said display means, means for generating text or graphics transmit data corresponding to said written text or graphics data, means for generating audio transmit data corresponding to audible data, means for combining said audio and text or graphics transmit data, and means for transmitting said combined data over said telephone line without significant degradation of said audio or graphics quality.

8. A system as in claim 7 wherein each of said terminals include means for receiving data transmitted over said common telephone line from another one of said terminals, said data including audio and text or graphics information, display means for visually displaying said received graphics data thereby providing a common display between said terminals, and an integrated speakerphone for providing an audio signal corresponding to said received audio data simultaneously with said displayed text or graphics data.

9. In an integrated audiographics system including a plurality of audiographics telephone terminals connected to a common telephone line, each of said terminals comprising means for dialing a telephone number to establish a telephone connection between two or more of said terminals, means for generating text or graphics digital transmit information, means for transmitting and receiving digital data over said common telephone line, said digital data including text or graphics information, display means for visually displaying said received text or graphics digital data thereby providing a common visual display between said terminals having a telephone connection to one another, and light pen means for enabling a user to visually write text or draw graphics information on said display means.

* * * * *